(12) United States Patent
Yuan et al.

(10) Patent No.: US 9,411,086 B2
(45) Date of Patent: Aug. 9, 2016

(54) OPTICAL WAVEGUIDE ASSEMBLY AND LIGHT ENGINE INCLUDING SAME

(71) Applicant: Cree, Inc., Durham, NC (US)

(72) Inventors: Zongjie Yuan, Grayslake, IL (US); Kurt S. Wilcox, Libertyville, IL (US); Jiayin Ma, Newtonville, NY (US)

(73) Assignee: Cree, Inc., Durham, NC (US)

( * ) Notice: Subject to any disclaimer, the term of this patent is extended or adjusted under 35 U.S.C. 154(b) by 202 days.

(21) Appl. No.: 14/101,099

(22) Filed: Dec. 9, 2013

(65) Prior Publication Data

US 2014/0211504 A1  Jul. 31, 2014

Related U.S. Application Data

(63) Continuation-in-part of application No. 13/842,521, filed on Mar. 15, 2013, and a continuation-in-part of application No. 13/839,949, filed on Mar. 15, 2013, and a continuation-in-part of application No. 13/841,074, filed on Mar. 15, 2013, and a continuation-in-part of application No. 13/840,563, filed on Mar. 15, 2013, and a continuation-in-part of application No. 13/938,877, filed on Jul. 10, 2013.

(60) Provisional application No. 61/758,660, filed on Jan. 30, 2013.

(51) Int. Cl.
*F21V 8/00* (2006.01)
*G02F 1/1335* (2006.01)

(52) U.S. Cl.
CPC ............ *G02B 6/0016* (2013.01); *G02B 6/0021* (2013.01); *G02B 6/0038* (2013.01); *G02B 6/0078* (2013.01); *G02B 6/0085* (2013.01); *G02B 6/0046* (2013.01); *G02F 1/1335* (2013.01)

(58) Field of Classification Search
USPC .............................................. 385/27; 362/247
See application file for complete search history.

(56) References Cited

U.S. PATENT DOCUMENTS

| 3,532,871 | A | 10/1970 | Shipman |
|---|---|---|---|
| 4,146,297 | A | 3/1979 | Alferness et al. |
| 4,441,787 | A | 4/1984 | Lichtenberger |
| 4,714,983 | A | 12/1987 | Lang |
| 4,977,486 | A | 12/1990 | Gotoh |

(Continued)

FOREIGN PATENT DOCUMENTS

| DE | 20014114 | 12/2000 |
|---|---|---|
| DE | 20107425 | 7/2001 |

(Continued)

OTHER PUBLICATIONS

International Search Report and Written Opinion for International Application No. PCT/US2014/013854, issued Jun. 5, 2014, Applicant, Cree, Inc. (15 pages).

(Continued)

*Primary Examiner* — Eric Wong
(74) *Attorney, Agent, or Firm* — McCracken & Gillen LLC

(57) ABSTRACT

An optical waveguide assembly includes a plurality of separate body sections each having a coupling cavity for receiving an LED element and a light extraction feature spaced from the coupling cavity, and a mounting structure surrounding the plurality of body sections that maintains the plurality of body sections in assembled relationship. The waveguide assembly may be incorporated into a light engine.

42 Claims, 14 Drawing Sheets

(56) References Cited

U.S. PATENT DOCUMENTS

| | | | |
|---|---|---|---|
| 5,009,483 A | 4/1991 | Rockwell, III | |
| 5,047,761 A | 9/1991 | Sell | |
| 5,253,317 A | 10/1993 | Allen et al. | |
| 5,528,720 A | 6/1996 | Winston et al. | |
| 5,613,751 A | 3/1997 | Parker et al. | |
| 5,613,770 A | 3/1997 | Chin, Jr. et al. | |
| 5,658,066 A | 8/1997 | Hirsch | |
| 5,676,457 A | 10/1997 | Simon | |
| 5,777,857 A | 7/1998 | Degelmann | |
| 5,812,714 A | 9/1998 | Hulse | |
| 5,850,498 A | 12/1998 | Shacklette et al. | |
| 5,897,201 A | 4/1999 | Simon | |
| 5,974,214 A | 10/1999 | Shacklette et al. | |
| 6,079,838 A | 6/2000 | Parker et al. | |
| 6,139,176 A | 10/2000 | Hulse et al. | |
| 6,167,182 A | 12/2000 | Shinohara et al. | |
| 6,241,363 B1 | 6/2001 | Lee | |
| 6,304,693 B1 | 10/2001 | Buelow, II et al. | |
| 6,310,704 B1 | 10/2001 | Dogan et al. | |
| 6,473,554 B1 | 10/2002 | Pelka et al. | |
| 6,523,986 B1 | 2/2003 | Hoffmann | |
| 6,554,451 B1 | 4/2003 | Keuper | |
| 6,582,103 B1 | 6/2003 | Popovich et al. | |
| 6,647,199 B1 | 11/2003 | Pelka et al. | |
| 6,671,452 B2 | 12/2003 | Winston et al. | |
| 6,679,621 B2 | 1/2004 | West et al. | |
| 6,712,481 B2 | 3/2004 | Parker et al. | |
| 6,724,543 B1 | 4/2004 | Chinniah et al. | |
| 6,758,582 B1 | 7/2004 | Hsiao et al. | |
| 6,896,381 B2 | 5/2005 | Benitez et al. | |
| 6,924,943 B2 | 8/2005 | Minano et al. | |
| 7,025,482 B2 | 4/2006 | Yamashita et al. | |
| 7,046,905 B1 | 5/2006 | Gardiner et al. | |
| 7,063,430 B2 | 6/2006 | Greiner | |
| 7,090,370 B2 | 8/2006 | Clark et al. | |
| 7,118,253 B1 | 10/2006 | Simon | |
| 7,152,985 B2 | 12/2006 | Benitez et al. | |
| 7,160,010 B1 * | 1/2007 | Chinniah | F21S 48/215 362/511 |
| 7,160,015 B2 | 1/2007 | Parker | |
| 7,168,841 B2 | 1/2007 | Hsieh et al. | |
| 7,175,330 B1 | 2/2007 | Chen | |
| 7,178,941 B2 | 2/2007 | Roberge et al. | |
| 7,182,480 B2 | 2/2007 | Kan | |
| 7,209,628 B2 | 4/2007 | Winston et al. | |
| 7,222,995 B1 | 5/2007 | Bayat et al. | |
| 7,246,931 B2 | 7/2007 | Hsieh et al. | |
| 7,273,299 B2 | 9/2007 | Parkyn et al. | |
| 7,399,108 B2 | 7/2008 | Ayabe et al. | |
| 7,400,809 B2 | 7/2008 | Erben et al. | |
| 7,404,660 B2 | 7/2008 | Parker | |
| 7,422,357 B1 | 9/2008 | Chang | |
| 7,458,714 B2 | 12/2008 | Chang | |
| 7,486,854 B2 | 2/2009 | Van Ostrand et al. | |
| 7,488,093 B1 | 2/2009 | Huang et al. | |
| 7,513,672 B2 | 4/2009 | Parker | |
| 7,520,650 B2 | 4/2009 | Smith | |
| 7,534,013 B1 | 5/2009 | Simon | |
| 7,566,148 B2 | 7/2009 | Noh et al. | |
| 7,581,854 B2 | 9/2009 | Ford | |
| 7,635,205 B2 | 12/2009 | Yu et al. | |
| 7,641,363 B1 | 1/2010 | Chang et al. | |
| 7,648,256 B2 | 1/2010 | Shiratsuchi et al. | |
| 7,703,950 B2 | 4/2010 | Ewert et al. | |
| 7,703,967 B2 | 4/2010 | Parker | |
| 7,710,663 B2 | 5/2010 | Barnes et al. | |
| 7,722,241 B2 | 5/2010 | Chang | |
| 7,758,227 B1 | 7/2010 | Coleman | |
| 7,762,705 B2 | 7/2010 | Sakai et al. | |
| 7,766,515 B2 | 8/2010 | Condon et al. | |
| 7,776,236 B2 | 8/2010 | Shih et al. | |
| 7,780,306 B2 | 8/2010 | Hoshi | |
| 7,784,954 B1 | 8/2010 | Coleman | |
| 7,798,695 B2 | 9/2010 | Parker | |
| 7,806,581 B2 | 10/2010 | Lee | |
| 7,810,960 B1 | 10/2010 | Soderman et al. | |
| 7,810,968 B1 | 10/2010 | Walker et al. | |
| 7,813,131 B2 | 10/2010 | Liang | |
| 7,857,619 B2 | 12/2010 | Liu | |
| 7,866,871 B2 | 1/2011 | Couzin et al. | |
| 7,914,192 B2 | 3/2011 | Coleman | |
| 7,934,851 B1 | 5/2011 | Boissevain et al. | |
| 7,967,477 B2 | 6/2011 | Bloemen et al. | |
| 7,991,257 B1 | 8/2011 | Coleman | |
| 7,997,784 B2 | 8/2011 | Tsai | |
| 8,002,450 B2 | 8/2011 | Van Ostrand et al. | |
| 8,033,674 B1 | 10/2011 | Coleman et al. | |
| 8,033,706 B1 | 10/2011 | Kelly et al. | |
| 8,047,696 B2 | 11/2011 | Ijzerman et al. | |
| 8,087,807 B2 | 1/2012 | Liu et al. | |
| 8,152,352 B2 | 4/2012 | Richardson | |
| 8,162,524 B2 | 4/2012 | Van Ostrand et al. | |
| 8,177,408 B1 | 5/2012 | Coleman | |
| 8,218,920 B2 | 7/2012 | Van Ostrand et al. | |
| 8,220,980 B2 | 7/2012 | Gingrich, Iii | |
| 8,231,256 B1 | 7/2012 | Coleman et al. | |
| 8,246,187 B2 | 8/2012 | Cheong et al. | |
| 8,249,408 B2 | 8/2012 | Coleman | |
| 8,258,524 B2 | 9/2012 | Tan et al. | |
| 8,272,756 B1 | 9/2012 | Patrick | |
| 8,272,770 B2 | 9/2012 | Richardson | |
| 8,282,261 B2 | 10/2012 | Pance et al. | |
| 8,283,853 B2 | 10/2012 | Yan et al. | |
| 8,287,152 B2 | 10/2012 | Gill | |
| 8,297,801 B2 | 10/2012 | Coushaine et al. | |
| 8,297,818 B2 | 10/2012 | Richardson | |
| 8,314,566 B2 | 11/2012 | Steele et al. | |
| 8,317,363 B2 | 11/2012 | Zheng | |
| 8,319,130 B2 | 11/2012 | Lee et al. | |
| 8,328,403 B1 * | 12/2012 | Morgan | G02B 6/26 362/606 |
| 8,331,746 B2 | 12/2012 | Bogner et al. | |
| 8,353,606 B2 | 1/2013 | Jeong | |
| 8,382,387 B1 | 2/2013 | Sandoval | |
| 8,408,737 B2 | 4/2013 | Wright et al. | |
| 8,410,726 B2 | 4/2013 | Dau et al. | |
| 8,412,010 B2 | 4/2013 | Ghosh et al. | |
| 8,419,224 B2 | 4/2013 | Wan-Chih et al. | |
| 8,434,914 B2 | 5/2013 | Li et al. | |
| 8,449,128 B2 | 5/2013 | Ko et al. | |
| 8,506,112 B1 | 8/2013 | Dau et al. | |
| 8,608,351 B2 | 12/2013 | Peifer | |
| 8,641,219 B1 | 2/2014 | Johnson et al. | |
| 8,657,479 B2 | 2/2014 | Morgan et al. | |
| 8,755,005 B2 | 6/2014 | Bierhuizen et al. | |
| 8,864,360 B2 | 10/2014 | Parker et al. | |
| 8,917,962 B1 | 12/2014 | Nichol et al. | |
| 2002/0172039 A1 | 11/2002 | Inditsky | |
| 2004/0008952 A1 | 1/2004 | Kragl | |
| 2004/0080938 A1 * | 4/2004 | Holman | F21S 8/08 362/231 |
| 2004/0213003 A1 | 10/2004 | Lauderdale et al. | |
| 2005/0210643 A1 | 9/2005 | Mezei et al. | |
| 2006/0002146 A1 | 1/2006 | Baba | |
| 2007/0245607 A1 | 10/2007 | Awai et al. | |
| 2008/0186273 A1 | 8/2008 | Krijn et al. | |
| 2009/0103293 A1 | 4/2009 | Harbers et al. | |
| 2009/0297090 A1 | 12/2009 | Bogner et al. | |
| 2010/0027257 A1 | 2/2010 | Boonekamp et al. | |
| 2010/0046219 A1 | 2/2010 | Pijlman et al. | |
| 2010/0073597 A1 | 3/2010 | Bierhuizen et al. | |
| 2010/0079843 A1 | 4/2010 | Derichs et al. | |
| 2010/0079980 A1 | 4/2010 | Sakai | |
| 2010/0128483 A1 | 5/2010 | Reo et al. | |
| 2010/0208460 A1 | 8/2010 | Ladewig et al. | |
| 2010/0220497 A1 | 9/2010 | Ngai | |
| 2010/0238645 A1 * | 9/2010 | Bailey | G02B 19/0028 362/84 |
| 2010/0328936 A1 | 12/2010 | Pance et al. | |
| 2011/0037388 A1 | 2/2011 | Lou et al. | |
| 2011/0170289 A1 | 7/2011 | Allen et al. | |
| 2011/0233568 A1 | 9/2011 | An et al. | |
| 2011/0249467 A1 | 10/2011 | Boonekamp | |

(56) References Cited

U.S. PATENT DOCUMENTS

| | | | |
|---|---|---|---|
| 2011/0273079 A1* | 11/2011 | Pickard | H01L 33/504 |
| | | | 313/483 |
| 2011/0273882 A1 | 11/2011 | Pickard | |
| 2011/0299807 A1 | 12/2011 | Kim et al. | |
| 2011/0305018 A1* | 12/2011 | Angelini | F21V 5/04 |
| | | | 362/238 |
| 2012/0033445 A1 | 2/2012 | Desmet et al. | |
| 2012/0170266 A1 | 7/2012 | Germain et al. | |
| 2012/0170316 A1 | 7/2012 | Lee et al. | |
| 2012/0170318 A1 | 7/2012 | Tsai et al. | |
| 2012/0182767 A1 | 7/2012 | Pectavich et al. | |
| 2012/0212957 A1 | 8/2012 | Hyun et al. | |
| 2012/0230019 A1 | 9/2012 | Peifer | |
| 2012/0287619 A1 | 11/2012 | Pickard et al. | |
| 2012/0298181 A1 | 11/2012 | Cashion et al. | |
| 2012/0320626 A1 | 12/2012 | Quilici et al. | |
| 2013/0010464 A1 | 1/2013 | Shuja et al. | |
| 2013/0021799 A1* | 1/2013 | Veerasamy | H01L 25/0753 |
| | | | 362/247 |
| 2013/0044480 A1 | 2/2013 | Sato et al. | |
| 2013/0170210 A1 | 7/2013 | Athalye | |
| 2013/0215612 A1 | 8/2013 | Garcia | |
| 2013/0279198 A1 | 10/2013 | Lin et al. | |
| 2013/0343045 A1 | 12/2013 | Lodhie et al. | |
| 2013/0343055 A1 | 12/2013 | Eckert et al. | |
| 2013/0343079 A1 | 12/2013 | Unger et al. | |
| 2014/0071687 A1 | 3/2014 | Tickner et al. | |
| 2014/0334126 A1 | 11/2014 | Speier et al. | |

FOREIGN PATENT DOCUMENTS

| | | |
|---|---|---|
| DE | 10047101 | 5/2002 |
| DE | 10203106 | 7/2003 |
| DE | 10302563 | 7/2004 |
| DE | 10302564 | 7/2004 |
| DE | 102006009325 | 9/2007 |
| DE | 102006011296 | 9/2007 |
| DE | 102006013343 | 9/2007 |
| WO | WO 2011/130648 | 10/2011 |

OTHER PUBLICATIONS

Web page at http://www.fusionoptix.com/lighting/components/array-optics.htm, printed May 9, 2013 (2 pages).

U.S. Appl. No. 13/657,421, filed Oct. 22, 2012 (38 pages).

Web page at http://www.oluce.com/en/lamps/table/colombo-281-detail, printed Nov. 19, 2013 (2 pages).

Invitation to Pay Additional Fees dated May 1, 2014, for International Application No. PCT/US2014/013931, Applicant, Cree, Inc. (2 pages).

Invitation to Pay Additional Fees dated May 1, 2014, for International Application No. PCT/US2014/013934, Applicant, Cree, Inc. (2 pages).

International Search Report and Written Opinion dated May 19, 2014, for International Application No. PCT/US2014/013891 (12 pages).

International Search Report and Written Opinion dated Jul. 14, 2014, for International Application No. PCT/US2014/013931 Applicant, Cree, Inc. (21 pages).

International Search Report and Written Opinion dated Jul. 10, 2014, for International Application No. PCT/US2014/013934, Applicant, Cree, Inc. (19 pages).

* cited by examiner

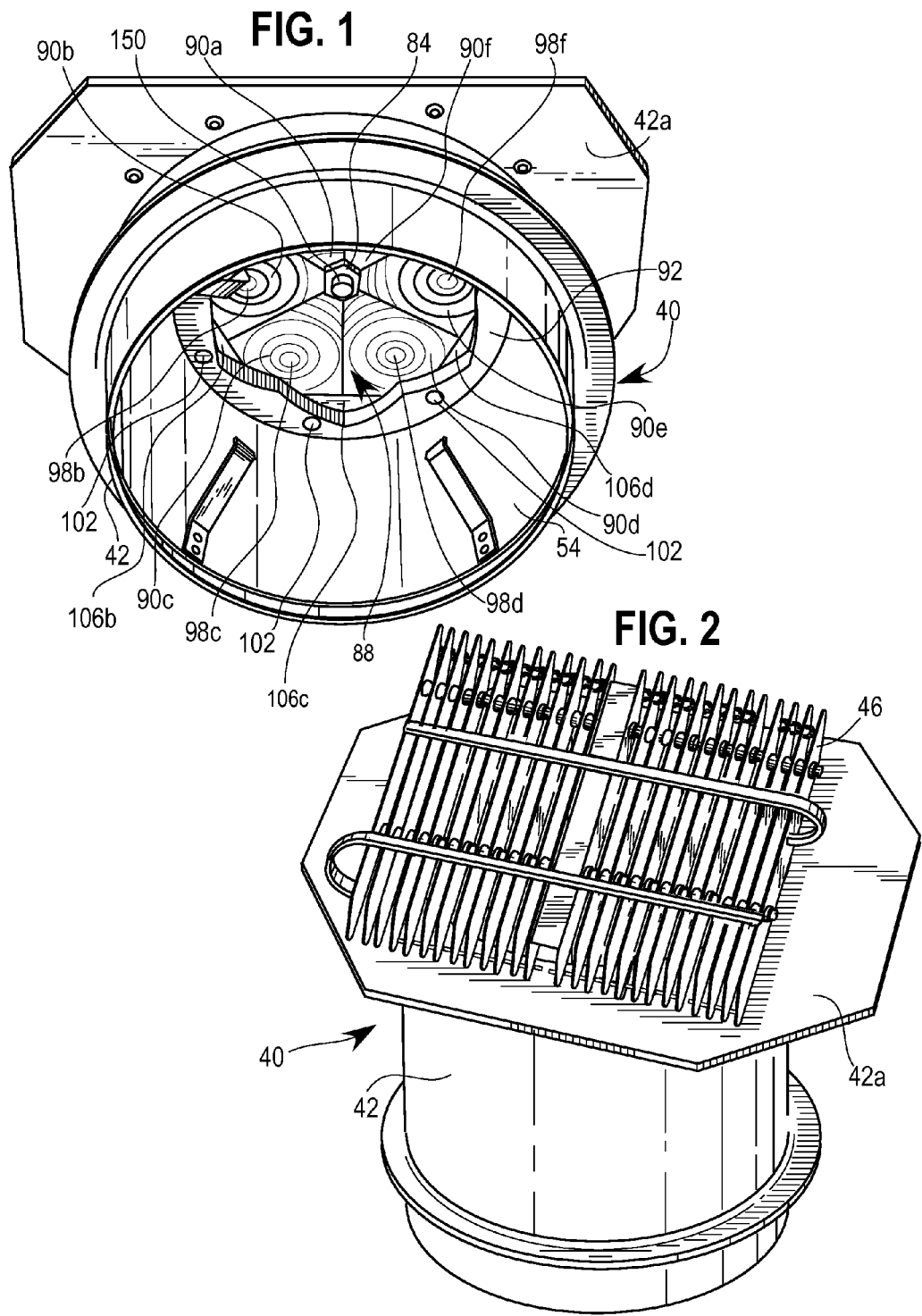

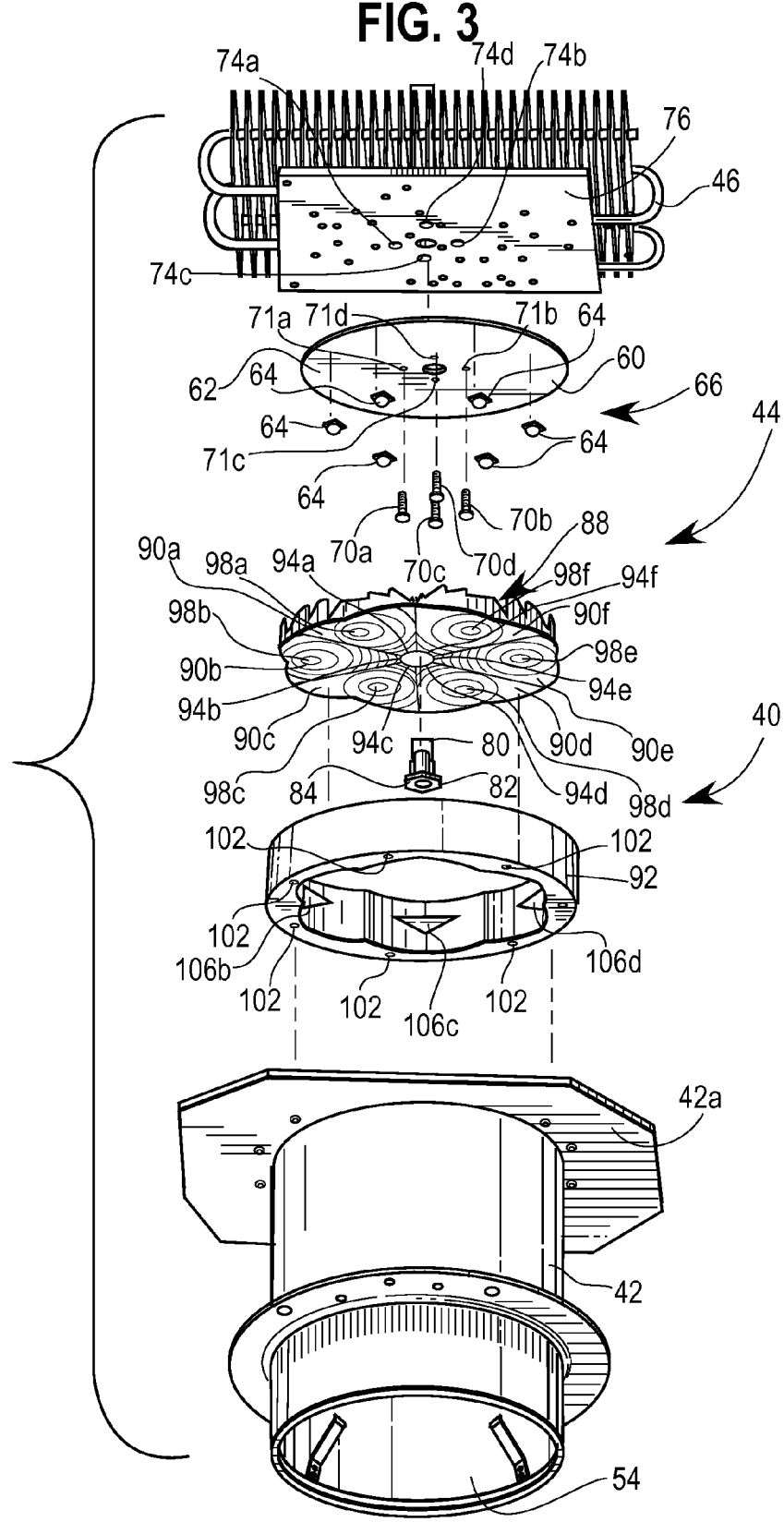

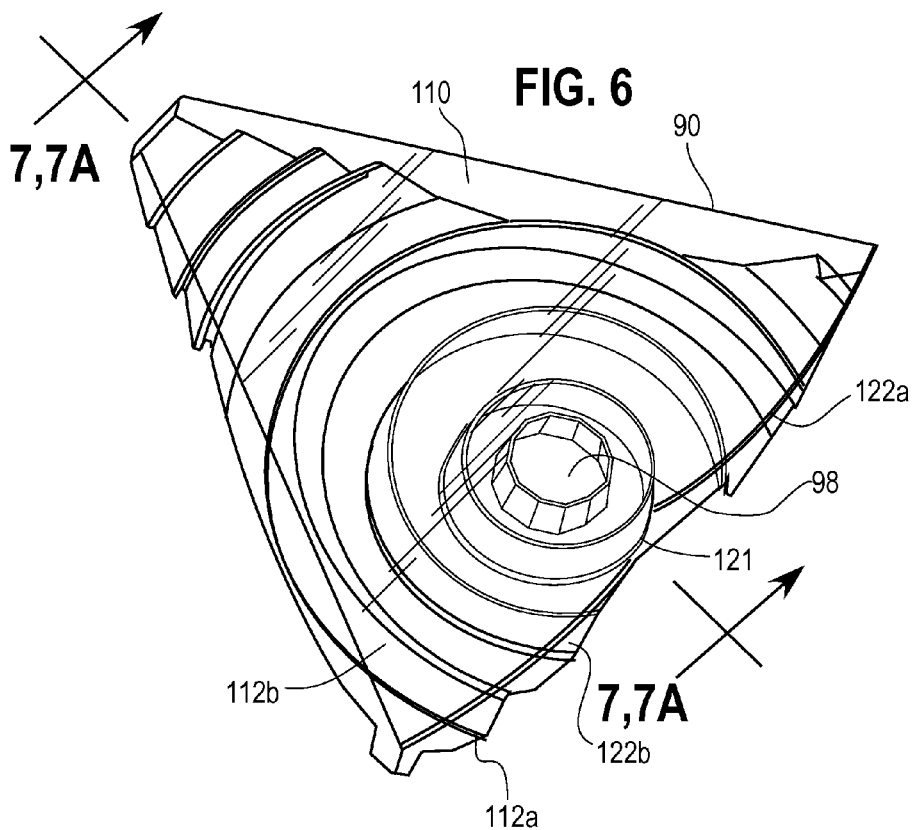
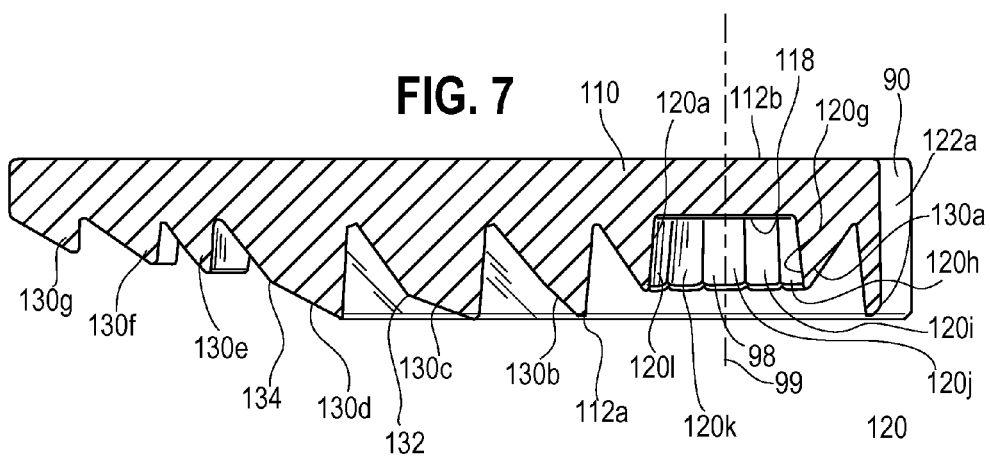

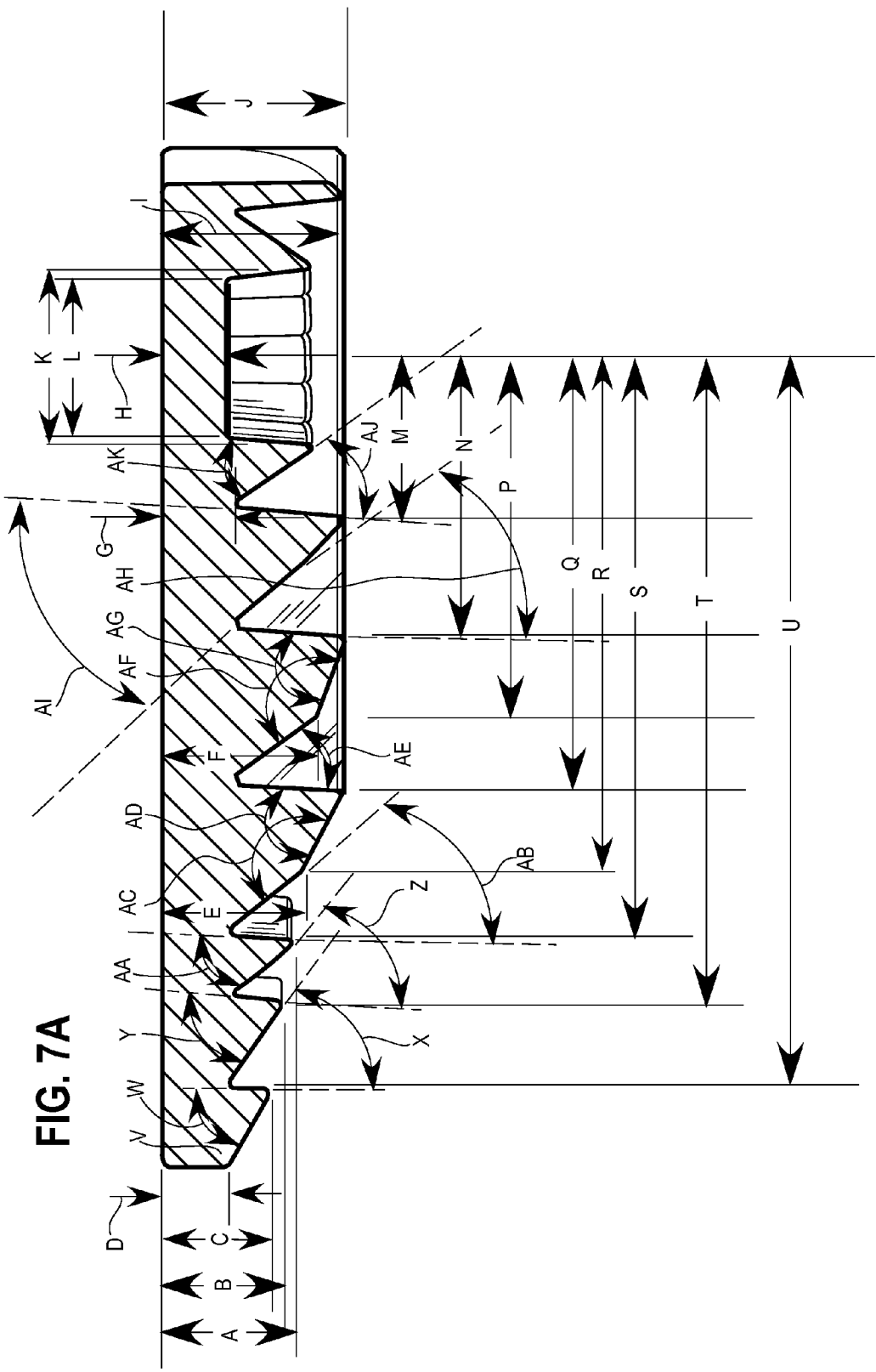

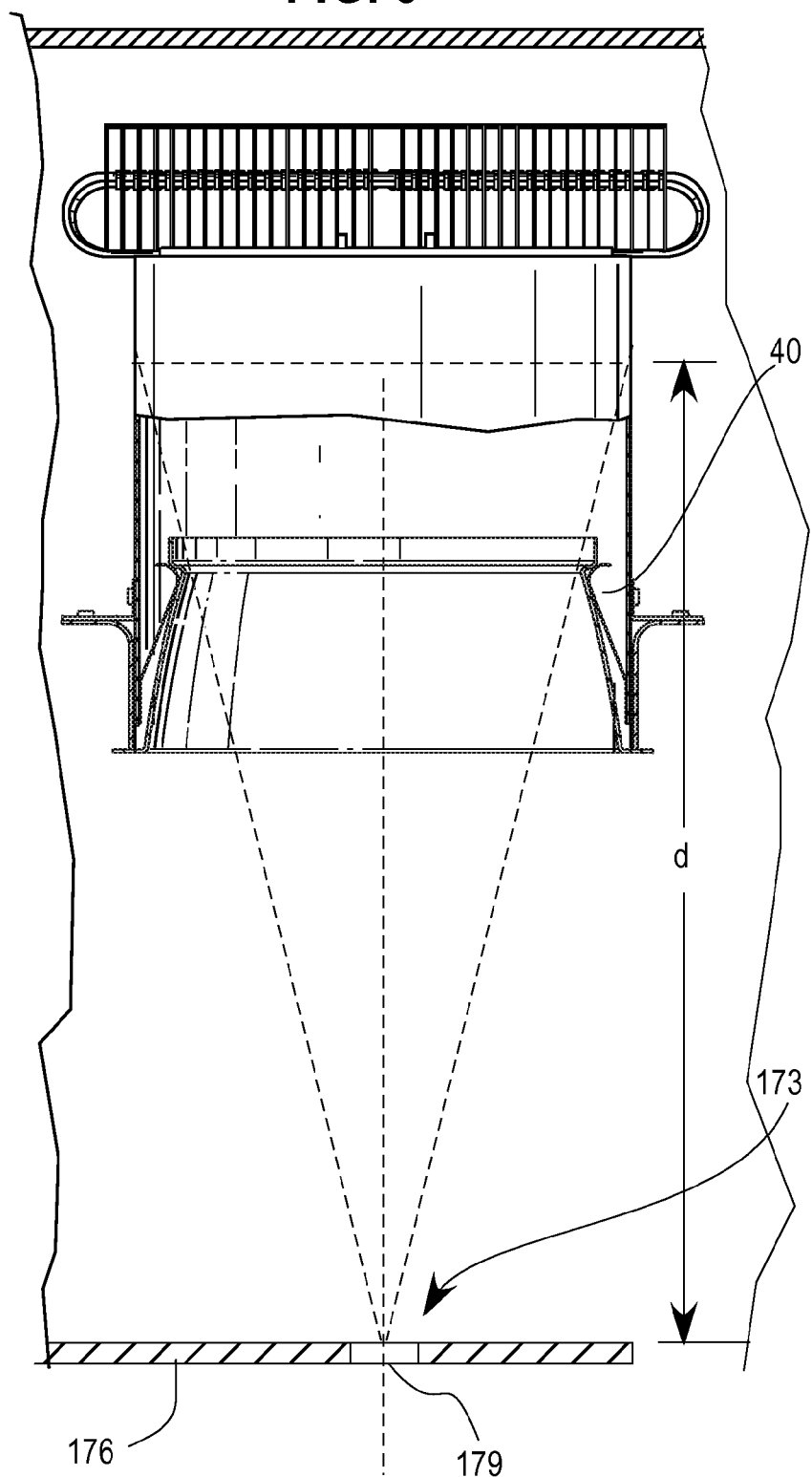

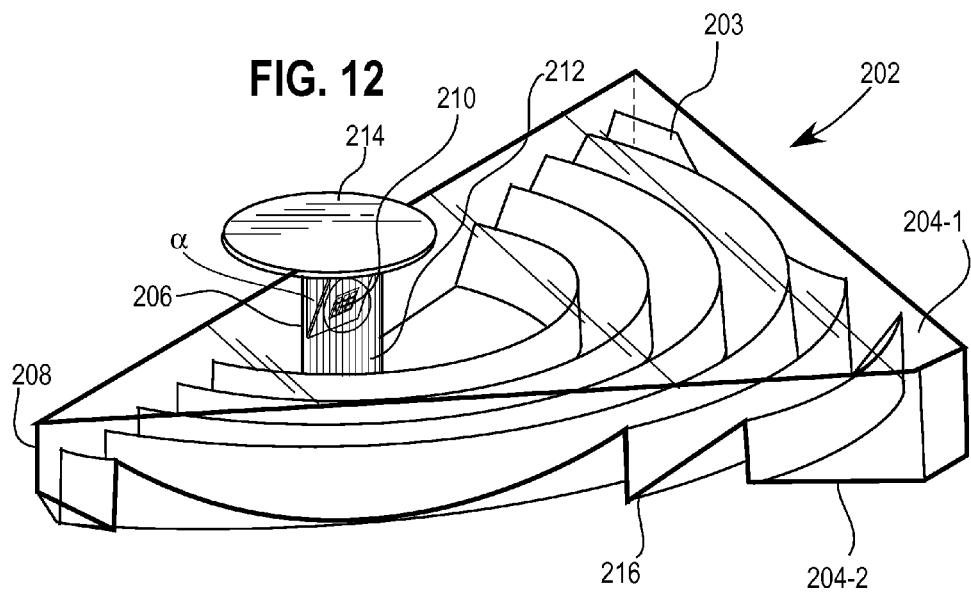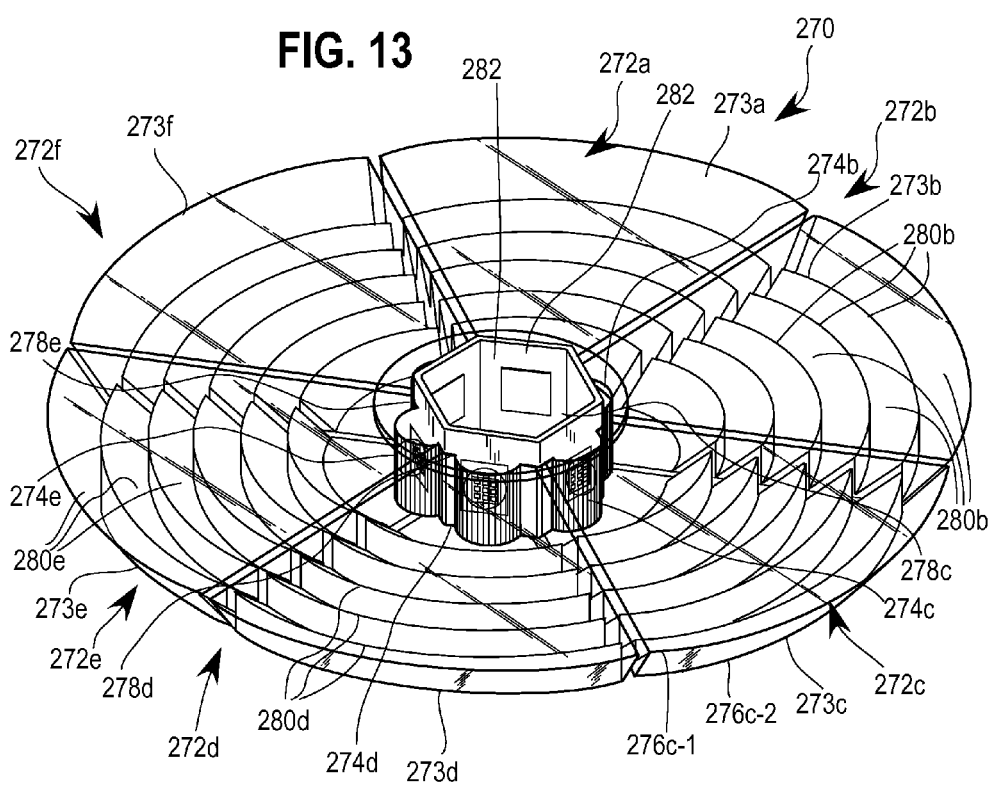

OPTICAL WAVEGUIDE ASSEMBLY AND LIGHT ENGINE INCLUDING SAME

CROSS REFERENCE TO RELATED APPLICATIONS

The present application claims the benefit of U.S. Provisional Patent Application No. 61/758,660, filed Jan. 30, 2013, entitled "Optical Waveguide" and further comprises a continuation-in-part of U.S. patent application Ser. No. 13/842,521, filed Mar. 15, 2013, entitled "Optical Waveguides" and further comprises a continuation-in-part of U.S. patent application Ser. No. 13/839,949, filed Mar. 15, 2013, entitled "Optical Waveguide and Lamp Including Same" and further comprises a continuation-in-part of U.S. patent application Ser. No. 13/841,074, filed Mar. 15, 2013, entitled "Optical Waveguide Body" and further comprises a continuation-in-part of U.S. patent application Ser. No. 13/840,563, filed Mar. 15, 2013, entitled "Optical Waveguide and Luminaire Including Same" and further comprises a continuation-in-part of U.S. patent application Ser. No. 13/938,877, filed Jul. 10, 2013, entitled "Optical Waveguide and Luminaire Incorporating Same" all owned by the assignee of the present application, and the disclosures of which are incorporated by reference herein. This patent application also incorporates by reference co-pending U.S. patent application Ser. No. 14/101,086, entitled "Optical Waveguides and Luminaires Incorporating Same" by Bernd Keller et al., filed Dec. 9, 2013, U.S. patent application Ser. No. 14/101,132, entitled "Waveguide Bodies Including Redirection Features and Methods of Producing Same," by Eric J. Tarsa, filed Dec. 9, 2013, U.S. patent application Ser. No. 14/101,147, entitled "Luminaires Using Waveguide Bodies and Optical Elements," by Bernd Keller et al., filed Dec. 9, 2013, U.S. patent application Ser. No. 14/101,129, entitled "Simplified Low Profile Module with Light Guide for Pendant, Surface Mount, Wall Mount and Stand Alone Luminaires," by Eric J. Tarsa et al., filed Dec. 9, 2013, and U.S. patent application Ser. No. 14/101,051, entitled "Optical Waveguide and Lamp Including Same," by Zongjie Yuan et al., filed Dec. 9, 2013.

REFERENCE REGARDING FEDERALLY SPONSORED RESEARCH OR DEVELOPMENT

Not applicable

SEQUENTIAL LISTING

Not applicable

FIELD OF THE INVENTION

The present inventive subject matter relates to optical waveguides, and more particularly to optical waveguides for general lighting.

BACKGROUND OF THE INVENTION

An optical waveguide mixes and directs light emitted by one or more light sources, such as one or more light emitting diodes (LEDs). A typical optical waveguide includes three main components: one or more coupling elements, one or more distribution elements, and one or more extraction elements. The coupling component(s) direct light into the distribution element(s), and condition the light to interact with the subsequent components. The one or more distribution elements control how light flows through the waveguide and is dependent on the waveguide geometry and material. The extraction element(s) determine how light is removed by controlling where and in what direction the light exits the waveguide.

When designing a coupling optic, the primary considerations are: maximizing the efficiency of light transfer from the source into the waveguide; controlling the location of light injected into the waveguide; and controlling the angular distribution of the light in the coupling optic. One way of controlling the spatial and angular spread of injected light is by fitting each source with a dedicated lens. These lenses can be disposed with an air gap between the lens and the coupling optic, or may be manufactured from the same piece of material which defines the waveguide's distribution element(s). Discrete coupling optics allow numerous advantages such as higher efficiency coupling, controlled overlap of light flux from the sources, and angular control of how the injected light interacts with the remaining elements of the waveguide. Discrete coupling optics use refraction, total internal reflection, and surface or volume scattering to control the distribution of light injected into the waveguide.

After light has been coupled into the waveguide, it must be guided and conditioned to the locations of extraction. The simplest example is a fiber-optic cable, which is designed to transport light from one end of the cable to another with minimal loss in between. To achieve this, fiber optic cables are only gradually curved and sharp bends in the waveguide are avoided. In accordance with well-known principles of total internal reflectance light traveling through a waveguide is reflected back into the waveguide from an outer surface thereof, provided that the incident light does not exceed a critical angle with respect to the surface.

In order for an extraction element to remove light from the waveguide, the light must first contact the feature comprising the element. By appropriately shaping the waveguide surfaces, one can control the flow of light across the extraction feature(s). Specifically, selecting the spacing, shape, and other characteristic(s) of the extraction features affects the appearance of the waveguide, its resulting distribution, and efficiency.

Hulse U.S. Pat. No. 5,812,714 discloses a waveguide bend element configured to change a direction of travel of light from a first direction to a second direction. The waveguide bend element includes a collector element that collects light emitted from a light source and directs the light into an input face of the waveguide bend element. Light entering the bend element is reflected internally along an outer surface and exits the element at an output face. The outer surface comprises beveled angular surfaces or a curved surface oriented such that most of the light entering the bend element is internally reflected until the light reaches the output face Parker et al. U.S. Pat. No. 5,613,751 discloses a light emitting panel assembly that comprises a transparent light emitting panel having a light input surface, a light transition area, and one or more light sources. Light sources are preferably embedded or bonded in the light transition area to eliminate any air gaps, thus reducing light loss and maximizing the emitted light. The light transition area may include reflective and/or refractive surfaces around and behind each light source to reflect and/or refract and focus the light more efficiently through the light transition area into the light input surface of the light emitting panel. A pattern of light extracting deformities, or any change in the shape or geometry of the panel surface, and/or coating that causes a portion of the light to be emitted, may be provided on one or both sides of the panel members. A variable pattern of deformities may break up the light rays such that the internal angle of reflection of a portion of the light rays will be great enough to cause the light rays either to be emitted out of the panel or reflected back through the panel and emitted out of the other side.

Shipman, U.S. Pat. No. 3,532,871 discloses a combination running light reflector having two light sources, each of which, when illuminated, develops light that is directed onto a polished surface of a projection. The light is reflected onto a cone-shaped reflector. The light is transversely reflected into a main body and impinges on prisms that direct the light out of the main body.

Simon U.S. Pat. No. 5,897,201 discloses various embodiments of architectural lighting that is distributed from contained radially collimated light. A quasi-point source develops light that is collimated in a radially outward direction and exit means of distribution optics direct the collimated light out of the optics.

Kelly et al. U.S. Pat. No. 8,430,548 discloses light fixtures that use a variety of light sources, such as an incandescent bulb, a fluorescent tube and multiple LEDs. A volumetric diffuser controls the spatial luminance uniformity and angular spread of light from the light fixture. The volumetric diffuser includes one or more regions of volumetric light scattering particles. The volumetric diffuser may be used in conjunction with a waveguide to extract light.

Dau et al U.S. Pat. No. 8,506,112 discloses illumination devices having multiple light emitting elements, such as LEDs disposed in a row. A collimating optical element receives light developed by the LEDs and a light guide directs the collimated light from the optical element to an optical extractor, which extracts the light.

A.L.P. Lighting Components, Inc. of Niles, Ill., manufactures a waveguide having a wedge shape with a thick end, a narrow end, and two main faces therebetween. Pyramid-shaped extraction features are formed on both main faces. The wedge waveguide is used as an exit sign such that the thick end of the sign is positioned adjacent a ceiling and the narrow end extends downwardly. Light enters the waveguide at the thick end and is directed down and away from the waveguide by the pyramid-shaped extraction features.

Low-profile LED-based luminaires have recently been developed (e.g., General Electric's ET series panel troffers) that utilize a string of LED components directed into the edge of a waveguiding element (an "edge-lit" approach). However, such luminaires typically suffer from low efficiency due to losses inherent in coupling light emitted from a predominantly Lambertian emitting source such as a LED component into the narrow edge of a waveguide plane.

SUMMARY OF THE INVENTION

Disclosed is an optical waveguide assembly that comprises a plurality of separate body sections each comprising a coupling cavity for receiving an LED element and a light extraction feature spaced from the coupling cavity. Each body section comprises first and second curved walls disposed at an outer portion of the optical waveguide and that meet at an inflection portion spaced from another body section. A mounting structure surrounds the plurality of separate body sections and maintains the plurality of separate body sections in assembled relationship.

Also disclosed is a light engine that comprises an optical waveguide comprising a plurality of body sections each of a wedge-shape and comprising a recess for receiving at least one LED and a plurality of curved light extraction features surrounding the recess. Each body section comprises first and second curved walls disposed at an outer portion of the optical waveguide and that meet at an inflection portion spaced from another body section. A mounting structure surrounds the plurality of body sections and maintains the plurality of body sections in assembled relationship. The light engine further comprises a base mounting surface and a plurality of LEDs disposed on a circuit board such that the circuit board, the mounting structure, and the assembled body sections are secured relative to the base mounting surface.

Further disclosed is an optical waveguide assembly that comprises a plurality of separate body sections each comprising a coupling cavity for receiving an LED element and a light extraction feature having an aspect ratio spaced from the coupling cavity. A mounting structure surrounds the plurality of separate body sections and maintains the plurality of body sections in assembled relationship. The aspect ratio of the light extraction feature is greater than 0.1.

Yet further disclosed is a light engine that comprises an optical waveguide comprising a plurality of body sections each of a wedge-shape and comprising a recess for receiving at least one LED and a plurality of curved light extraction features that surround the recess. Each of the curved light extraction features has an aspect ratio such that the aspect ratios of the curved light extraction features increase with distance from the recess. A mounting structure surrounds the plurality of body sections and maintains the plurality of body sections in assembled relationship. The light engine further comprises a base mounting surface and a plurality of LEDs disposed on a circuit board such that the circuit board, the mounting structure, and the assembled body sections are secured relative to the base mounting surface.

Other aspects and advantages of the present invention will become apparent upon consideration of the following detailed description and the attached drawings.

BRIEF DESCRIPTION OF THE DRAWINGS

FIG. 1 is an isometric view looking up from below of a luminaire incorporating a waveguide according to an embodiment of the present invention;

FIG. 2 is an isometric view looking down from above of the luminaire of FIG. 1;

FIG. 3 is an exploded isometric view of the luminaire of FIG. 1;

FIG. 6 is an enlarged isometric view of a first side of an optical segment used in the luminaire of FIG. 1;

FIG. 7 is a sectional view taken generally along the lines 7-7 of FIG. 6;

FIG. 7A is a sectional view identical to FIG. 7 illustrating sample dimensions for the optical segment of FIG. 6;

FIG. 9 is a diagrammatic view illustrating a converging beam spread developed by the luminaire of FIGS. 1-3;

FIGS. 11-16 are perspective views of further embodiments of optical waveguides comprising a plurality of optical segments.

DETAILED DESCRIPTION OF THE PREFERRED EMBODIMENTS

Figure 4:
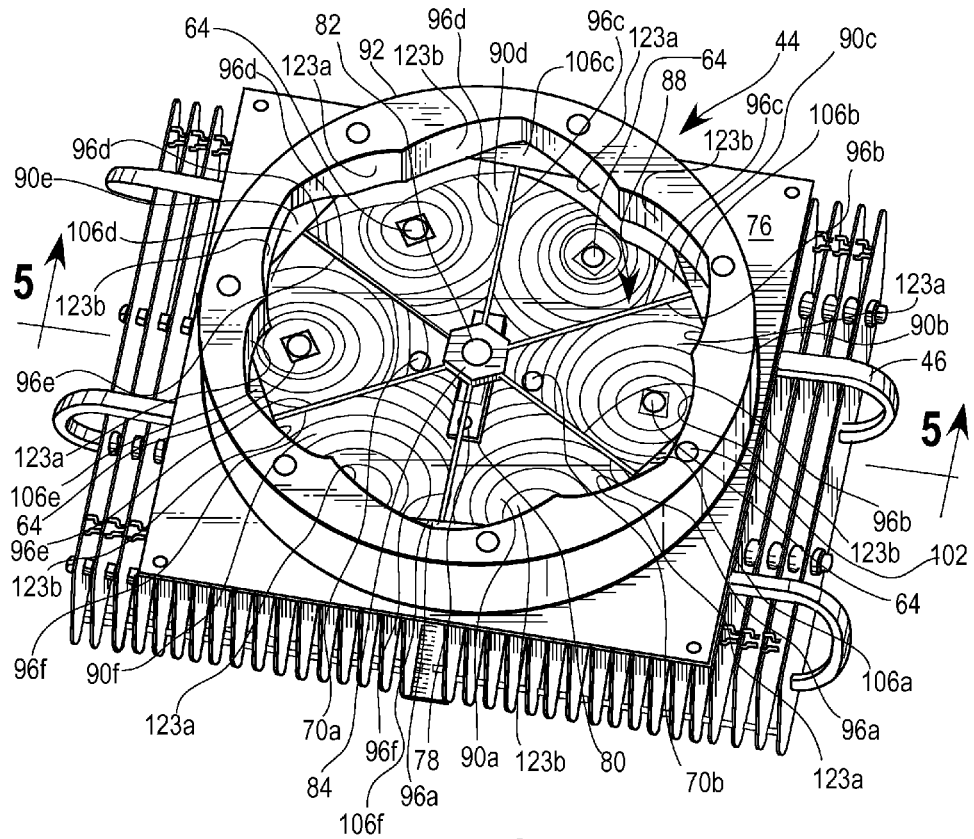
FIG. 4 is an isometric view of the light engine and heat exchanger of FIG. 1.

Referring first to FIGS. 1-3, a luminaire 40 includes a housing 42 to which a light engine 44 and a heat exchanger 46 are secured. Electrical power is supplied to components of the light engine 44 via electrical components and wires (not shown) disposed in electrical boxes and conduit sections (not shown) mounted in any suitable fashion on the housing 42. A diffuser ring (not shown) may extend into an opening 54 of the housing 42, if desired. The luminaire 40 may be of any desired size and/or shape. In the illustrated embodiment, the luminaire housing 42 has an opening diameter of about 16 cm, but may be as small as about 6 or larger. Also in the illustrated embodiment, the luminaire 40 is about 20 cm in height, but may be as small as 4 cm or larger.

With specific reference to FIG. 3, the light engine 44 includes a circuit board 60, which, in the illustrated embodiment, may be coated or covered by a white or specular reflective material 62. A plurality of spaced LED elements 64 together comprising a light source 66 is mounted on the material 62 (or, alternatively, directly on the circuit board 60) and the LED elements 64 are electrically coupled to an electrical power circuit (not shown) that is, for example, disposed in the electrical boxes noted above. The electrical power circuit may instead be located remotely, or a portion may be disposed in at least one of the electrical boxes and the remainder located remotely, as desired. In any event, the power circuit is designed to operate the light source 66 with AC or DC power in a desired fashion to produce light of a desired intensity and appearance. Preferably, the light source 66 develops relatively high intensity light appropriate for outdoor or indoor general illumination purposes including light similar or identical to that provided by an incandescent, halogen, or other lamp that may be incorporated in a parking lot light, a road way light, a light that produces a wall washing effect, a light usable in a large structure, such as a warehouse, an arena, a downlight, etc. The luminaire 40 is particularly adapted to develop high intensity light greater than 1000 lumens, and more particularly greater than 2000-5000 lumens, and can even be configured to develop 20,000 or more lumens by adding LED elements 64 and waveguide body sections described hereinafter.

Each LED element 64 may be a single white or other color LED, or each may comprise multiple LEDs either mounted separately or together on a single substrate or package to form a module including, for example, at least one phosphor-coated LED either alone or in combination with at least one color LED, such as a green LED, a yellow LED, a red LED, etc. In those cases where a soft white illumination is to be produced, each LED module 64 typically includes one or more blue shifted yellow LEDs and one or more red LEDs. Different color temperatures and appearances could be produced using other LED combinations, as is known in the art. In one embodiment, the light source comprises any LED, for example, an MT-G LED incorporating TrueWhite® LED technology or as disclosed in U.S. patent application Ser. No. 13/649,067, filed Oct. 10, 2012, entitled "LED Package with Multiple Element Light Source and Encapsulant Having Planar Surfaces" by Lowes et al., the disclosure of which is hereby incorporated by reference herein, as developed and manufactured by Cree, Inc., the assignee of the present application. If desirable, a side emitting LED disclosed in U.S. Pat. No. 8,541,795, the disclosure of which is incorporated by reference herein, may be utilized inside the waveguide body. In some embodiments, the light source may comprise one or more LEDs disposed vertically within the coupling cavity. In any of the embodiments disclosed herein the LED(s) preferably have a lambertian light distribution, although each may have a directional emission distribution (e.g., a side emitting distribution), as necessary or desirable. More generally, any lambertian, symmetric, wide angle, preferential-sided, or asymmetric beam pattern LED(s) may be used as the light source.

Figure 5:
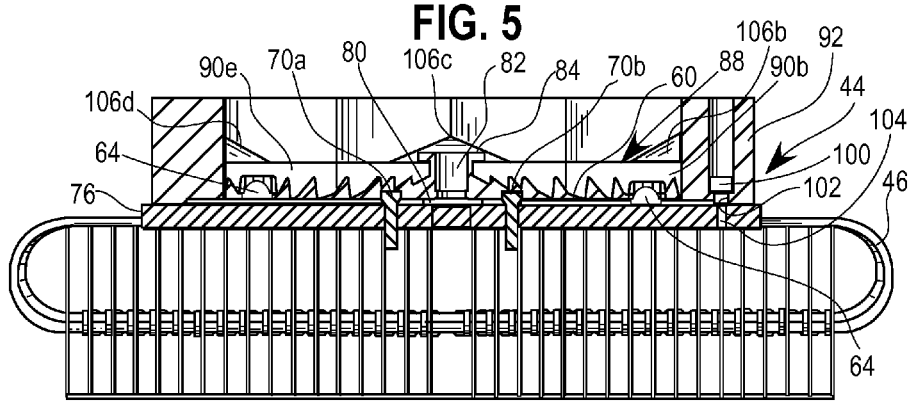
FIG. 5 is a sectional view taken generally along the lines 5-5 of FIG. 4.

The circuit board 60 is directly or indirectly (e.g., via an electrically insulating layer) secured to the heat exchanger 46. The heat exchanger 46 preferably has heat pipes that conduct a cooling fluid and fins to dissipate heat. The heat exchanger 46 is preferably arranged to eliminate thermal crosstalk between the LEDs and the power circuit. Two fasteners, such as screws 70a, 70b, extend through bores 71a, 71b in the circuit board 60 and into threaded bores 74a, 74b (FIG. 3) in a base mounting surface in the form of a heat exchanger plate 76. Two further fasteners, such as screws 70c, 70d, extend though bores 78 in a post mounting plate 80 (FIGS. 3-5) and through aligned bores 71c, 71d in the circuit board 60 and into threaded bores 74c, 74d, respectively, in the heat exchanger plate 76 (FIG. 5). A post 82 having a circumferential end flange 84 is carried by the plate 80 and maintained in a stationary position thereby.

An optical waveguide 88 comprising a plurality of separate waveguide body sections 90a-90f is secured proximate the circuit board 60 by a mounting structure in the Ruin of a mounting ring 92. Specifically, inner portions 94a-94f (FIG. 3) of the waveguide body sections 90a-90f, respectively, are placed between the circumferential end flange 84 and the circuit board 60 such that side surfaces 96a-96f (FIG. 4) of adjacent body sections 90a-90f abut one another, and so that the LED elements 64 are disposed in recesses comprising coupling cavities 98a-98f of the body sections 90a-90f, respectively, (see FIGS. 1 and 3). The mounting ring 92 is thereafter secured to the heat exchanger plate 76 by fasteners, such as further screws 100 that extend through bores 102 and into threaded bores 104, respectively (FIGS. 1 and 3-5). Inwardly-directed triangular webs 106a-106f of the mounting ring 92 bear against and capture outer portions 108a-108f of the body sections 90a-90f so that the body sections 90 are maintained in assembled relationship adjacent the circuit board 60 by the webs 106 and the end flange 84 of the post 82.

Referring specifically to FIGS. 1-3, the housing 42 includes a mounting plate 42a that is secured by threaded fasteners, such as screws (not shown), to the heat exchanger plate 76. The light engine 44 is thereby disposed in the housing 42 with the body sections facing the opening 54 and the heat exchanger 46 facing upwardly from the mounting plate 42a, as seen in FIGS. 1 and 2.

Figure 8:
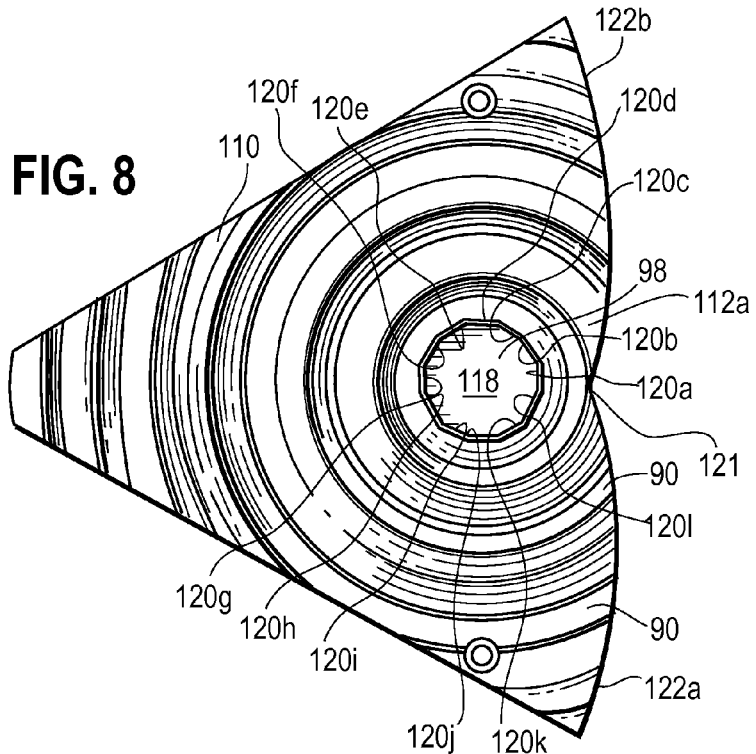
FIG. 8 is a plan view of a second side of the optical segment of 6.

Referring to FIGS. 6-8 the waveguide body sections 90 are all identical to one another and each is symmetric about view lines 7-7 in FIG. 6 (the view lines 7-7 are referred to as the symmetry plane of the body section 90 hereinafter). Each section 90 has a main body of material 110 having a width substantially greater than an overall thickness thereof and is substantially or completely wedge-shaped (otherwise also referred to a pie slice shape) in a dimension transverse to the width and thickness (FIG. 8). In the illustrated embodiment, each waveguide body section 90 includes a first or outer side or surface 112a, a second opposite inner side or surface 112b, and the coupling cavity 98, which in the illustrated embodiment, comprises a blind bore that does not extend fully through the waveguide body section 90 from the first side 112a to the second side 112b. Also in the illustrated embodiment, the coupling cavity 98 has a central axis 99 (FIG. 7) coincident with the symmetry plane and is defined by a base wall 118 and substantially or fully planar side walls or surfaces comprising twelve equally-sized facets 120*a*-120*l* (FIGS. 7 and 8) that are preferably (although not necessarily) disposed at other than a perpendicular angle relative to the first and second sides 112*a*, 112*b* of the waveguide body section 90. Further, in the illustrated embodiment, the coupling cavity 98 is disposed inside outer edge surfaces of the body section 90 and is not centrally located in the body section 90, but rather, is offset toward and aligned with an inflection portion 121 of outer curved surfaces 122*a*, 122*b* that define an outer perimeter of the outer portion 108. In all the embodiments disclosed herein, the facets 120*a*-120*l* are preferably polished and optically smooth. The coupling cavities may have a different shape, such as circular cylindrical, if desired, such as disclosed in co-pending U.S. patent application Ser. No. 13/839,949, incorporated by reference herein.

Also preferably, the outer curved surfaces 122*a*, 122*b* are polished and optically smooth and meet at the inflection portion 121. In the preferred embodiment the mounting ring 92 further includes a plurality of first and second inner surfaces 123*a*, 123*b*, respectively, (FIG. 4) that substantially or completely conform to the outer curved surfaces 122*a*, 122*b* of the body sections 90*a*-90*f* once the sections 90 are assembled together. Also in the preferred embodiment, the first and second surfaces 123*a*, 123*b* have a depth greater than depths of the body sections 90 (seen as dimension J in FIG. 7A), such that the surfaces 123*a*, 123*b* extend beyond the surfaces 122*a*, 122*b*, respectively, (refer to FIG. 1) and the first and second sections 123*a*, 123*b* are coated with a specular or white reflective material, if desired. The outer curved surfaces 122*a*, 122*b* and the first and second surfaces 123*a*, 123*b* minimize light leakage from the outer radial ends of the waveguide body sections 90. Each of the surfaces 122*a*, 122*b*, 123*a*, 123*b* preferably has a continuously curved shallow parabolic, elliptical, or round shape and are, in the illustrated embodiment, of similar or identical shapes. In one embodiment, the surfaces 122*a*, 122*b* and 123*a*, 123*b* are mirror images of one another with respect to the symmetry plane. In a particular embodiment, the surfaces 122*a*, 122*b* and 123*a*, 123*b* are sections of circles having radii of curvature greater than 20 mm, and more preferably between about 50 and about 300 mm, and most preferably equal to about 55 mm. In this embodiment the centers of the radii of curvature are preferably equally spaced from and disposed on opposite sides of the symmetry plane 7-7 of FIG. 6, in keeping with preferred symmetrical shape of the body section 90.

When the light source 66 is energized, light developed by the LED element 64 disposed in each coupling cavity 98 travels within the cavity 98 and a portion of the light enters into the associated waveguide body section 90 in a generally transverse direction along the width of the body of material 110. Other light is directed outwardly through the second side 122*b* opposite the LED element. If desired, a portion of the body section 90 opposite the coupling cavity 98 may be partially or fully transparent or translucent, as desired, to allow at least some light to be transmitted therethrough (for example, at least about 5% of the light may be transmitted through this portion). A plurality of extraction features 130 are disposed in the body section 90 to extract light traveling through the waveguide body section 90. The spacing, number, size and geometry of extraction features 130 determine the mixing and distribution of light in the waveguide body section 90 and light exiting the section 90. In the illustrated embodiment, the extraction features 130 comprise a series of ridges separated by intervening troughs at least some of which define one or more inverted V-shapes in cross section, as seen in FIG. 7. Also in the illustrated embodiment, one (and perhaps more) of the extraction features 130*a* is continuous (i.e., it extends fully in a continuous manner about the coupling cavity 98), and fully surrounds the coupling cavity 98, while the remaining extraction features 130*b*-130*g* comprise continuous or discontinuous ridges (i.e., partial circular or other curved and/or linear features continuously or discontinuously partially surrounding the coupling cavity 98) separated by intervening troughs. In the illustrated embodiment, all of the extraction features are circular (i.e., annular) and continuous or discontinuous. Two of the extraction features 130*c* and 130*d* have inflections (i.e., bends) 132, 134 in the ridges, as seen in FIG. 7, although these inflections need not be provided or other inflections or other surface features may be provided in any of the features 130. Still further in the illustrated embodiment all of the extraction features 130 are coaxial with the central axis 99 of the coupling cavity 98, and all are, therefore, symmetric with respect to the axis of symmetry of the body section 90. In addition to the foregoing, the waveguide body section 90 is tapered in an overall sense from the central axis 99 of the coupling cavity to an outside edge in that there is less material at the radially outside edges of the waveguide body section 90 than portions adjacent the central axis 99. Such tapering may be effectuated by providing extraction features that become deeper and/or are more widely separated with distance from the center of the waveguide body section 90, as noted in greater detail hereinafter. The tapering maximizes the possibility that substantially all the light introduced into the waveguide body section 90 is extracted over a single pass of the light through the body section 90. This results in substantially all of the light striking the radially outward surfaces of the extraction features 130, which are carefully controlled so that the extraction of light is also carefully controlled. The combination of tapering with the arrangement of extraction features result in improved color mixing with minimum waveguide thickness and excellent control over the emitted light.

In the illustrated embodiment, the light emitted out the waveguide body sections 90 is mixed such that point sources of light in the LED elements 64 are not visible to a significant extent and the emitted light is controlled and collimated to a high degree. As shown in FIG. 7, the coupling cavities 98*a*-98*f* may extend fully through the body sections 90*a*-90*f*, respectively, although each coupling cavity 98*a*-98*f*, or one or more coupling cavities 98*a*-98*f*, may extend only partially through the body section 90*a*-90*f*, respectively. It should be noted that the light sources need not be located at one or more interior portions of the waveguide body section (which embodiments are referred to as "interior lit"). Rather, the coupling cavity may be positioned along the inner portion 94 (refer to FIGS. 13 and 15) or outer curved surfaces 122*a*, 122*b* (refer to FIGS. 11, 12, 14, and 16) to obtain an "edge lit" waveguide, as described in greater detail below. In edge lit embodiments, the light source may be above, below, and/or to the side of the edge and aligned therewith as shown and described in co-pending U.S. patent application Ser. No. 14/101,086, entitled "Optical Waveguides and Luminaires Incorporating Same," filed Dec. 9, 2013. A reflecting cover or member may be disposed over, under, or otherwise adjacent to the light source in any of the embodiments disclosed herein. In other embodiments, the light source may be disposed adjacent an elongate coupling section. In some embodiments, the waveguide body section may include more than one coupling cavity. A waveguide body section may be interior lit and/or edge lit, and/or include one or more elongate coupling cavities, as desired. Further, it may be desirable to tilt the light source at an angle α within the coupling cavity as shown in FIG. 12. For example, where the light source extends into the waveguide body section from an edge thereof as shown in FIG. 12, the central axis of the light source may be disposed at a non-zero angle with respect to the lateral extent of the waveguide body section. Where the light source extends into a coupling cavity transverse to the lateral extent of the waveguide body section as shown in FIG. 5, the central axis of the light source may be disposed at a non-zero angle relative to the central axis of the coupling cavity.

Figure 8A:
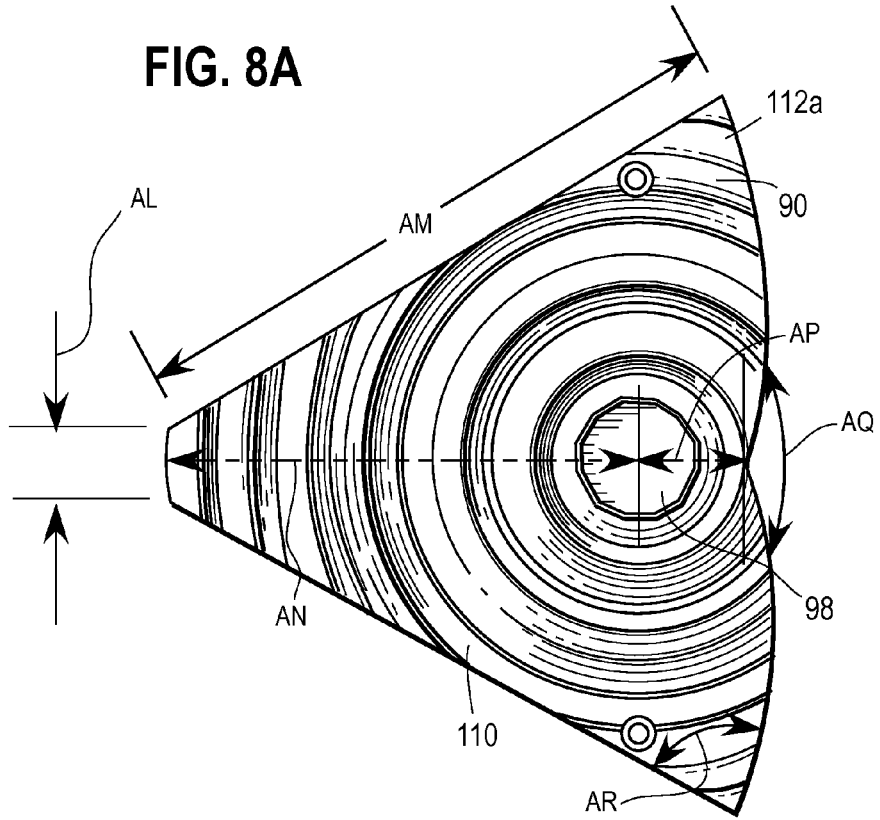
FIG. 8A is a plan view identical to FIG. 8 illustrating further sample dimensions for the optical segment of FIG. 6.

In the illustrated embodiment shown in FIGS. 7 and 8, each waveguide body section 90 is made of any optical grade material including one or more of acrylic, air, polycarbonate, molded silicone, glass, and/or cyclic olefin copolymers, and combinations thereof, particularly (although not exclusively) in a layered arrangement to achieve a desired effect and/or appearance. In one example, the waveguide body section 90 has the dimensions noted in the following table and as seen in FIGS. 7A and 8A. It should be noted that the dimensions in the following table as exemplary only and not limiting:

TABLE 1

| REFERENCE (FIGS. 7A and 8A) | NOMINAL DIMENSION (Millimeters - unless otherwise specified) |
|---|---|
| A | 9 |
| B | 8.1 |
| C | 7.2 |
| D | 4.2 |
| E | 9.06 |
| F | 10.03 |
| G | 4.92 |
| H | 4.2 |
| I | 11.6 |
| J | 11.9 |
| K | 9.94 |
| L | 11.4 |
| M | 10.44 |
| N | 17.64 |
| P | 33.6 |
| Q | 28.5 |
| R | 33.6 |
| S | 38.1 |
| T | 42.18 |
| U | 48 |
| V | 120° |
| W | 60° |
| X | 60° |
| Y | 60° |
| Z | 43° |
| AA | 38° |
| AB | 45° |
| AC | 160° |
| AD | 65° |
| AE | 40° |
| AF | 145° |
| AG | 75° |
| AH | 42° |
| AI | 42° |
| AJ | 33° |
| AK | 28° |
| AL | 7.8 |
| AM | 71.5 |
| AN | 53.2 |
| AP | 11.45 |
| AQ | 135 |
| AR | 73.5 |

From the foregoing dimensions one can calculate extraction feature aspect ratios as follows:

$$\text{Aspect Ratio} = \text{Width of ridge/Greatest height extent of ridge} \quad (1)$$

Using the foregoing equation, one can calculate (at least approximately) aspect ratios AR1, AR2, AR3, and AR4 of various extraction features 130b, 130d, 130f, and, 130g respectively, denoted in FIG. 7 as follows:

$$AR1 = (N-M)/(J-G) = (17.64 - 10.44)/(11.9 - 4.92) = 7.2/6.98 = 1.032 \quad (2)$$

$$AR2 = (S-Q)/(J-D) = (38.1 - 28.5)/(11.9 - 4.2) = 9.6/7.7 = 1.247 \quad (3)$$

$$AR3 = (U-T)/(B-D) = (48 - 42.18)/(8.1 - 4.2) = 5.82/3.9 = 1.492 \quad (4)$$

$$AR4 = (AN-U)/(C-D) = (53.2 - 48)/(7.2 - 4.2) = 5.2/3.0 = 1.733 \quad (5)$$

As seen in FIGS. 7, 7A, 8, and 8A and as calculated above in the equations (2)-(5), the extraction features 130 range between aspect ratios of about 1.032 to about 1.733. Preferably, although not necessarily, the present invention contemplates the use of extraction features having aspect ratios that vary between about 0.1 and about 25, and more preferably between about 0.2 and about 8, and most preferably between about 0.3 and about 4. In a waveguide body section having a different size, the dimension(s) of the extraction feature(s) are scaled based on the total thickness of the waveguide while the aspect ratio falls within the ranges noted above.

Further, the height of the extraction features as shown in FIG. 7A ranges from about 3 mm to about 7 mm. Such height depends on the overall thickness of the waveguide body section. Generally, the height of the extraction features may range from about 1 mm to about 60 mm, where a height of 60 mm may be appropriate for a waveguide body section having a thickness of 100 mm. Further, a ratio of extraction feature height to the overall waveguide body thickness can be determined. From the dimensions provided in Table 1, the ratio of extraction feature height to overall waveguide body thickness ranges from about 1:4 to about 1:2. The ratio is preferably between about 1:8 and about 2:3, with ratios between about 1:6 and about 3:4 being more preferred, and ratios between about 1:5 and about 4:5 being most preferred. As noted above, the heights of the extraction features and ratios to the overall thickness of the waveguide body section will depend on the size and geometry of the waveguide body section.

It should be noted that, in the illustrated embodiment, the luminaire 40 may be designed to provide a beam angle that has a minimum transverse spread at a particular distance d from the waveguide body sections 90 and larger transverse spreads at lesser and greater distances from the body sections 90. More particularly, referring to FIG. 9, the extraction features 130 direct light rays emitted at radially outward portions of the waveguide body sections 90 are directed axially inwardly and downwardly (as seen in FIG. 9), with the magnitude of the angle of inward direction being roughly or substantially proportional to the radial distance of emission of the light ray from the center of the luminaire 40. The resulting beam shape is such that a convergence region 173 is formed at a distance d from the outer surface of the waveguide. Light rays diverge at distances greater than d from the body sections 90. This beam shape permits a trim or diffuser ring 176 to have a relatively small diameter aperture 179 but still have a significantly large illumination area beyond the distance d. The result is a reduction in visible glare because of the shielding effect provided by the trim ring 176 and a pleasing aesthetic appearance. In general, the size of the aperture 179 is preferably equal to or smaller than the size of the combined waveguide body sections 90 of the luminaire 40, and, more preferably, the cross sectional size of the aperture 179 relative to the cross sectional size of the combined waveguide body sections 90 is between about 1:2 to about 1:4.

In another embodiment, the luminaire 40 may be designed to create a beam angle that preferably is between less than about 5 degrees to greater than 60 degrees, and more preferably between about 5 degrees and about 50 degrees and most preferably between about 6 degrees and about 40 degrees. The beam peak can either be centered in the nadir (as in a PAR application) or off-center (as in an outdoor application). The beam angle and/or peak can be controlled through appropriate design of the waveguide body sections 90.

In any of the embodiments disclosed herein, the extraction features may be similar or identical to one another in shape, size, and/or pitch, or may be different from one another in any one or more of these parameters, as desired. Further, while the extraction features are shown as extending into the side 112a, it should be noted that one or more extraction features may extend into or be disposed on any of the sides of the body section 90, such as the side 112b.

In the illustrated embodiment, the multiple LED coupling cavities are disposed at locations offset with respect to the geometric center of the luminaire 40, and preferably, at equally spaced radially outer locations in each body section 90. Thus, heat developed by the LED elements disposed in the coupling cavities is spread out and more readily managed. Also, if desired, a sensor, such as an illumination or temperature sensor 150, may be disposed at the center of the luminaire 40, preferably supported by the post 82, as seen in FIG. 1. The sensor may be a part of the power circuit and may develop a feedback signal therefor.

Also preferably, the LED elements 64 are disposed on the circuit board 60 at equal vertical heights. Each waveguide body section 90 includes extraction features 130 that preferably terminate at the side surfaces 96 of the body sections 90. Still further, the extraction features 130 are preferably symmetric about the symmetry plane, and, in the illustrated embodiment, the waveguide body sections 90 are identical to one another. However, the extraction features need not terminate at the side surfaces 96, and may terminate at some other location(s) of the body sections 90. Still further, the extraction features 130 and/or other portions of the body sections 90 need not be identical to corresponding portions of one or more other body sections 90. Accordingly, the distribution of extraction elements over the entire combined set of waveguide sections 90a-90f may be asymmetric when considering the luminaire 40 as a whole so that an overall desired light emission distribution can be obtained. For example, three identical first body sections may be disposed at one side of the luminaire 40 and three identical second body sections may be disposed at another side of the luminaire 40, wherein the first body sections are different than the second body sections so that an asymmetric illumination distribution suitable for a wall wash application may be obtained. Such a feature allows effective optic function in a limited space/size and for modest cost in an application where multiple light elements are used. Also, greater or fewer than six body sections 90 may be utilized, and the sizes of the body sections may the same, as illustrated, or different in any combination. Preferably, a single LED element may be disposed in a coupling cavity of an associated body section, although a body section may include multiple coupling cavities each containing one or more LED elements therein.

By using the features disclosed herein spacing to mounting height ratios of at least about 0.3, and more preferably between about 0.3 and about 1.2.

The circumferential placement of multiple LED lamps and optics overlays the illumination from each LED optic onto each other, which further helps color mixing while maintaining a desired photometric distribution. If necessary or desirable, color mixing may be enhanced by using any of the structures or cavities disclosed in co-pending applications U.S. patent application Ser. No. 14/101,086, filed Dec. 9, 2013, entitled "Optical Waveguides and Luminaires Incorporating Same," U.S. patent application Ser. No. 14/101,132, filed Dec. 9, 2013, entitled "Waveguide Bodies Including Redirection Features and Methods of Producing Same," U.S. patent application Ser. No. 14/101,147, filed Dec. 9, 2013, entitled "Luminaire Using Waveguide Bodies and Optical Elements" and U.S. patent application Ser. No. 14/101,05, filed Dec. 9, 2013, entitled "Optical Waveguide and Lamp Including Same" owned by the assignee of the present application and filed herewith, the disclosures of which are incorporated by reference herein.

If desired, each coupling cavity may extend fully through the associated body section and a light diverter of any suitable shape and design, such as a conical plug member may extend into the coupling cavity as disclosed in copending U.S. patent application Ser. No. 13/839,949, incorporated by reference herein. Also, any of the other features disclosed in co-pending U.S. patent application Ser. No. 13/839,949 and/or U.S. patent application Ser. No. 13/840,563, may be used in the luminaire 40 as desired.

Figure 10:
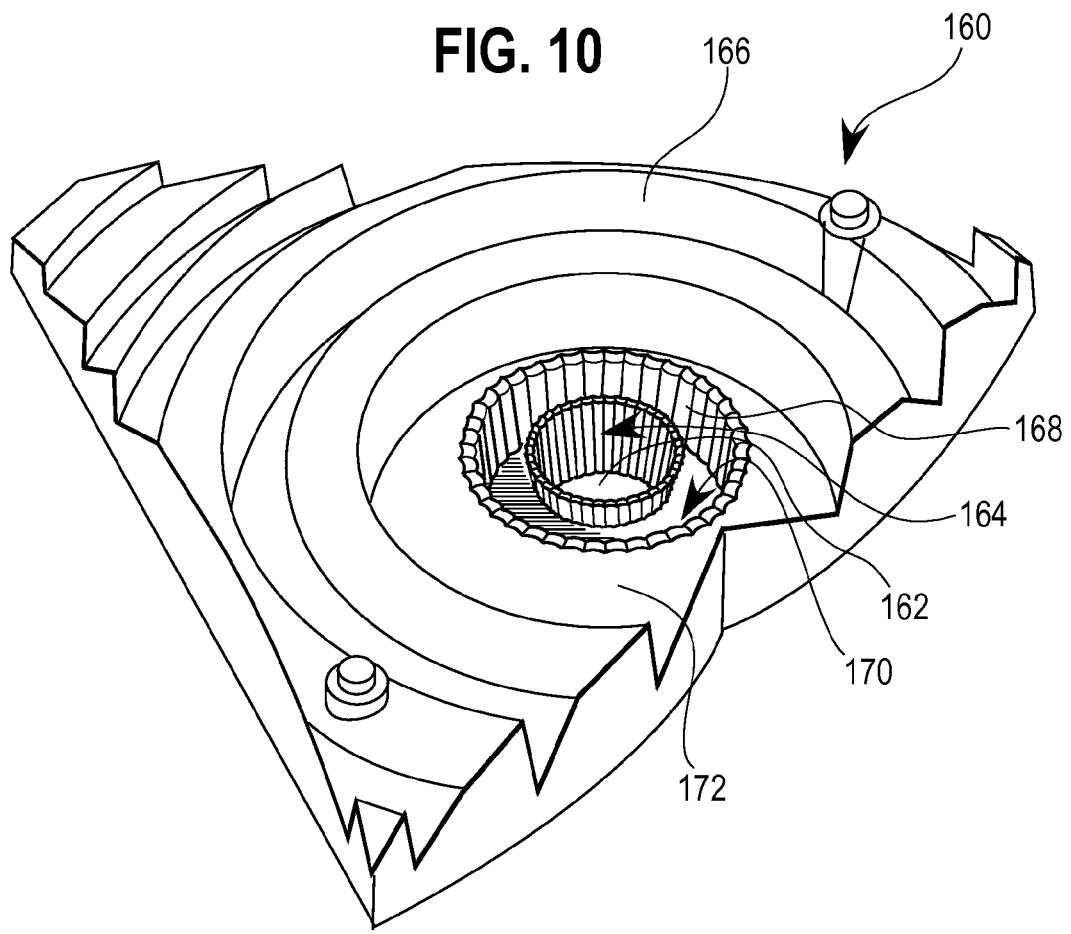
FIG. 10 is an enlarged isometric view of a first side of a further embodiment of an optical segment.

Referring to FIG. 10, an alternative embodiment of the waveguide body section 160 includes a coupling cavity 162 having one or more light coupling features 164 that extend into the waveguide body 166 to enhance light uniformity and color mixing. In general, directing light into a wide range of refraction angles enhances light mixing. Because the angle $A_r$ of a refracted light ray is a function of the angle $A_i$ between the incident light ray and the interface surface struck by the incident light ray (with refractive angle $A_r$ increasing as $A_i$ approaches zero, i.e., when the incident light ray approaches a parallel condition with respect to the interface surface), a wide range of refracted light ray angles can be obtained by configuring the interface surfaces to include a wide range of angles relative to the incident light rays. The coupling cavity 162, which may comprise a blind cavity or a cavity that extends fully through the waveguide body 166, includes one or more light coupling features 164 in the form of a circumferential array of inwardly directed surfaces, shown as bumps or protrusions. The bumps or protrusions, each of which may comprise curved, planar, and/or other-shaped surfaces, promote mixing of light by providing surfaces at varying angles with respect to incident light rays developed by an LED light source 64 (see FIG. 5). The light coupling features may take the form of other shapes, such as, for example, points directed into the waveguide body. Further, it may be desired to include light coupling features 168 along a first surface 170 of an innermost extraction feature 172 that immediately surrounds the coupling cavity 162. In the event that the coupling cavity extends fully through the waveguide body, a light diverter (not shown) may be provided opposite the LED light source 64 (see FIG. 5).

FIGS. 11-16 demonstrate alternative embodiments of the waveguide including varying the numbers of waveguide body sections and/or modifying the location of the light source(s) as described in greater detail below. Such alternative waveguide body sections may be maintained in place relative to one another by any suitable apparatus as in the previous embodiment of FIGS. 1-5.

Figure 11:
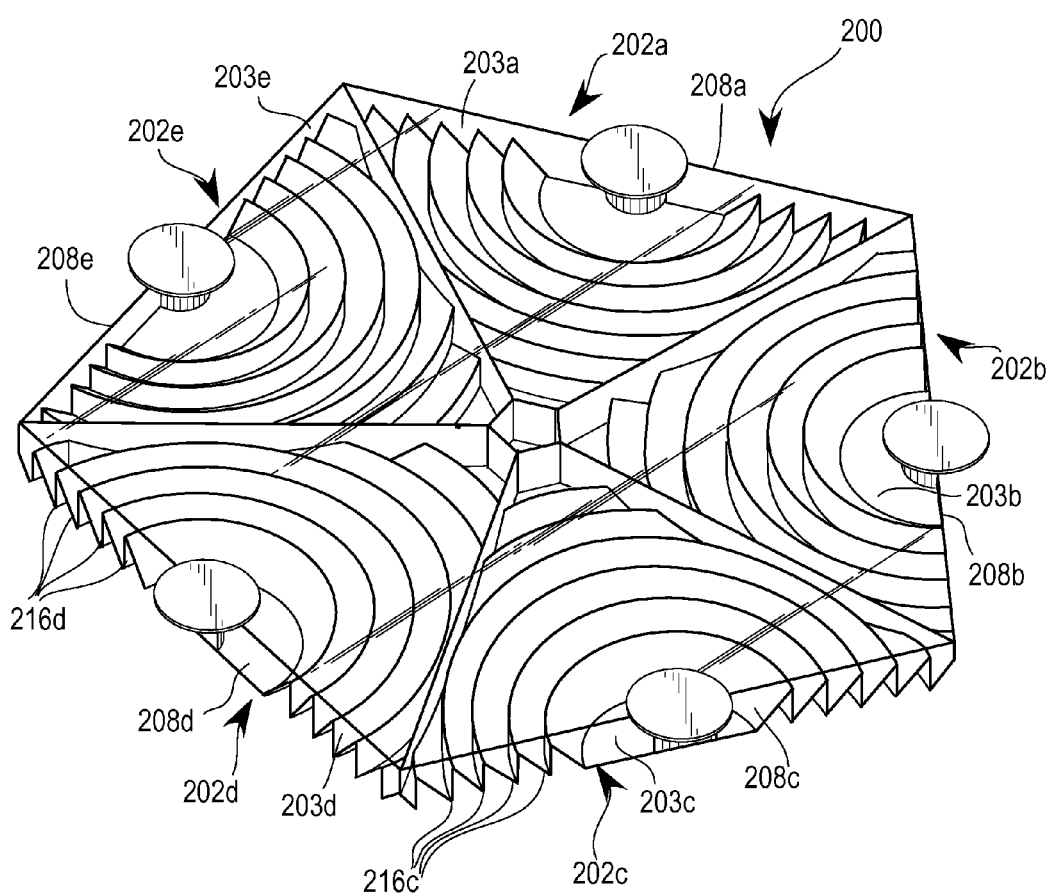
Figure 14:
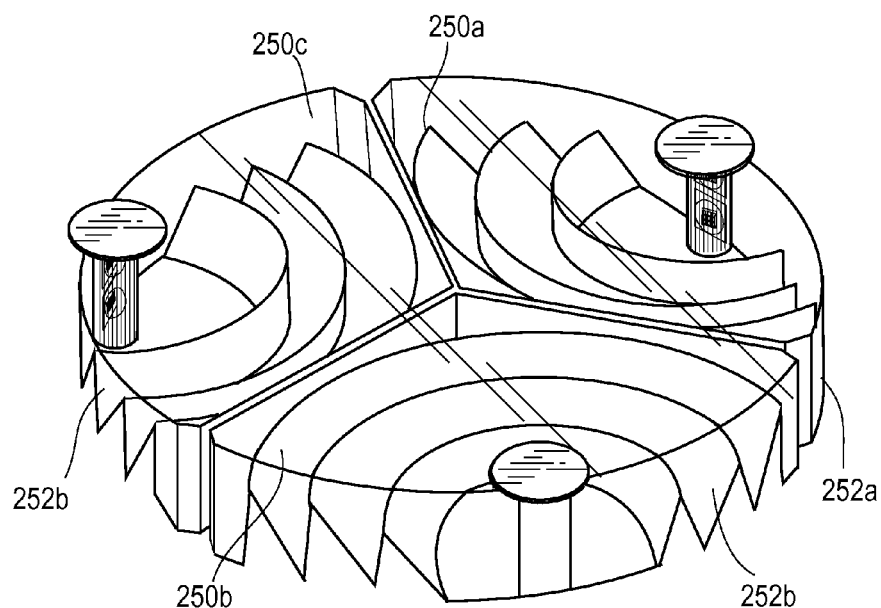
Figure 16:
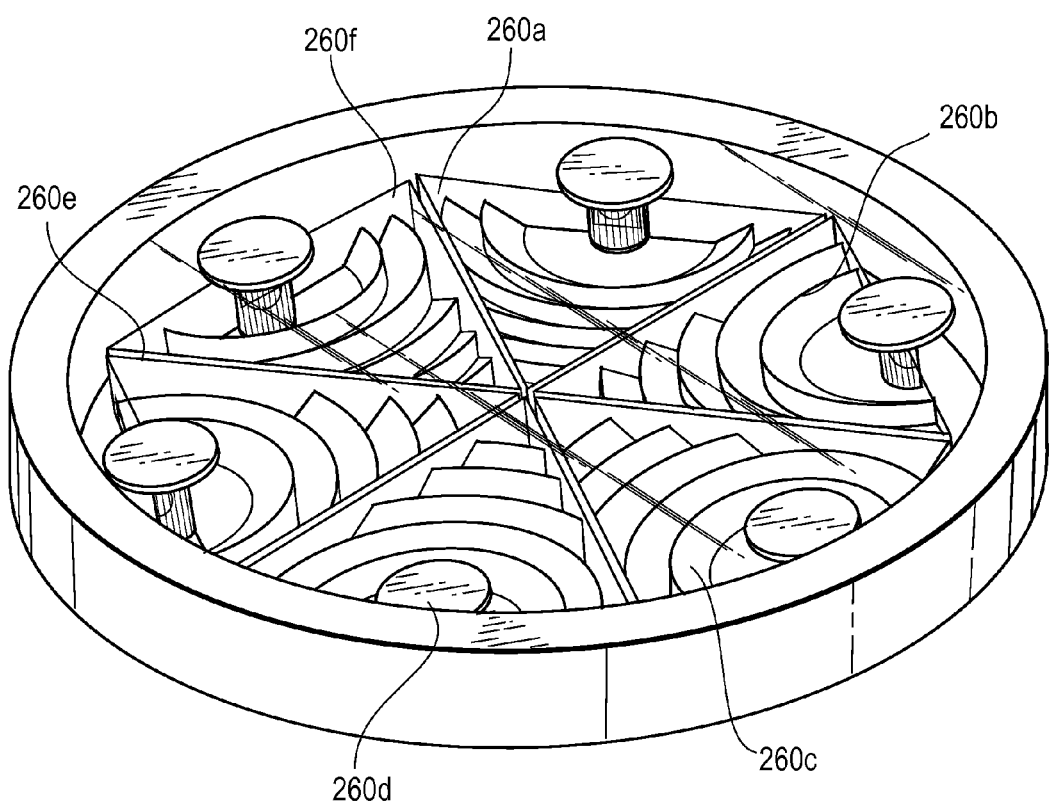

In FIG. 11, an alternative embodiment of the waveguide 200 comprises five identical waveguide body sections 202a-202e. Referring to FIG. 12, each waveguide body section 202 includes a waveguide body 203 having first and second surfaces 204-1, 204-2 and a coupling cavity 206 that extends at least partially between the first and second surfaces 204-1, 204-2. The coupling cavity 206 is preferably (although not necessarily) semicircular cylindrical in overall shape (neglecting the protrusions) and positioned along an outer surface 208 of the waveguide body section 202. An LED element 210 is disposed vertically within each coupling cavity 206. Similar to the embodiment shown in FIG. 10, the coupling cavity 206 includes a plurality of light coupling features 212 that extend into the waveguide body 203. A plate 214 coplanar with the first and/or second surfaces 204-1, 204-2 of the waveguide body 203 may be disposed above and/or below the LED 210. Alternatively, or in addition, a plug member (not shown) may be at least partially disposed in the coupling cavity 206 or formed integrally with the waveguide body 203 adjacent the LED 210 to divert light into the waveguide body section 202. The plate 214 and/or plug member (not shown) may be coated with a reflective white or specular coating or other material, such as paper or a scattering film. Similar to the embodiment shown in FIG. 6, a plurality of extraction features 216 comprise a series of ridges separated by intervening troughs at least some of which define one or more inverted V-shapes in cross section. The extraction features 216 are preferably (although not necessarily) arcuate (preferably annular), and surround and are coaxial with respect to the coupling cavity 206, although the extraction features may be otherwise positioned and/or configured as desired. FIGS. 14 and 16 illustrate further embodiments identical to that shown in FIGS. 11 and 12, except that the five waveguide body sections 202 are replaced by three and six identical waveguide body sections 250a-250c and 260a-260f, respectively, with different extraction feature numbers, spacing, and/or shapes. Further, each waveguide body sections 250a-250c of FIG. 14 has a curved outer surface 252a-252c, in contrast to the relatively linear outer surface 208a-208e of the waveguide body sections 202a-202e in FIGS. 11 and 12.

Figure 15:
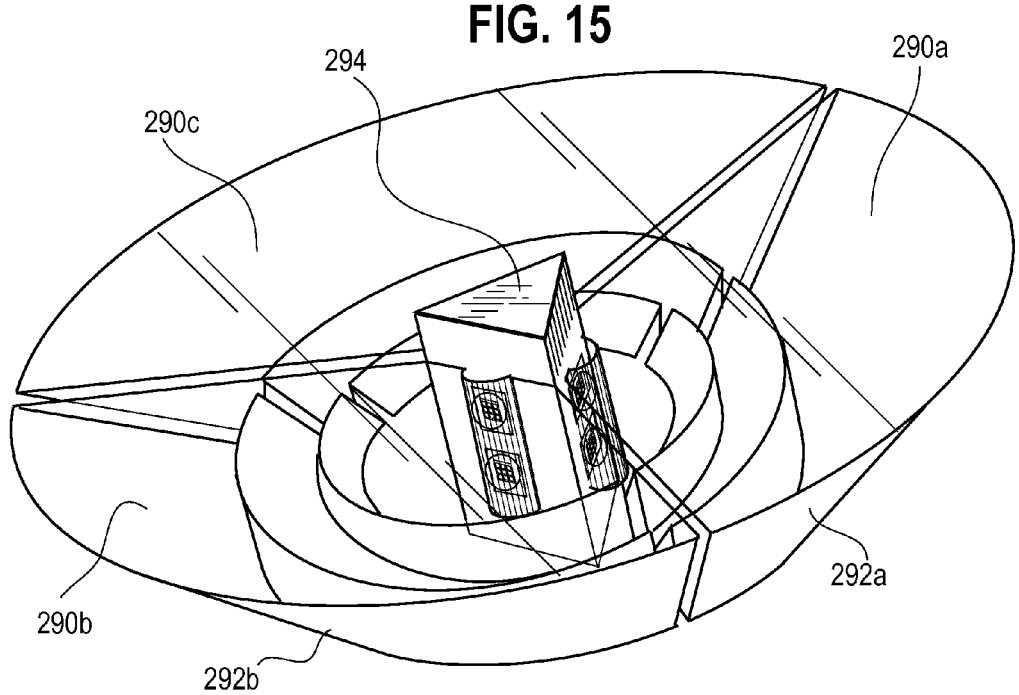

Referring next to FIG. 13, a further embodiment of the waveguide 270 comprises six identical waveguide body sections 272a-272f, wherein each waveguide body section 272 includes a waveguide body 273. A coupling cavity 274 that at least partially extends between first and second surfaces 276-1, 276-2 is positioned along an inner portion 278 of a waveguide body 273. Each coupling cavity 274 is preferably (although not necessarily) semicircular cylindrical in overall shape (neglecting the protrusions) and extraction features 280 similar or identical to the extraction features of previous embodiments may surround the coupling cavity 274 and may be coaxial with respect thereto. FIG. 15 illustrates a further embodiment that is identical to the embodiment shown in FIG. 13, except that the six waveguide body sections are replaced by three identical waveguide body sections 290a-290c, with different extraction feature numbers, spacing, and/or shapes, and outer surfaces 292a-292c are tapered to assist in light extraction.

Figure 17:
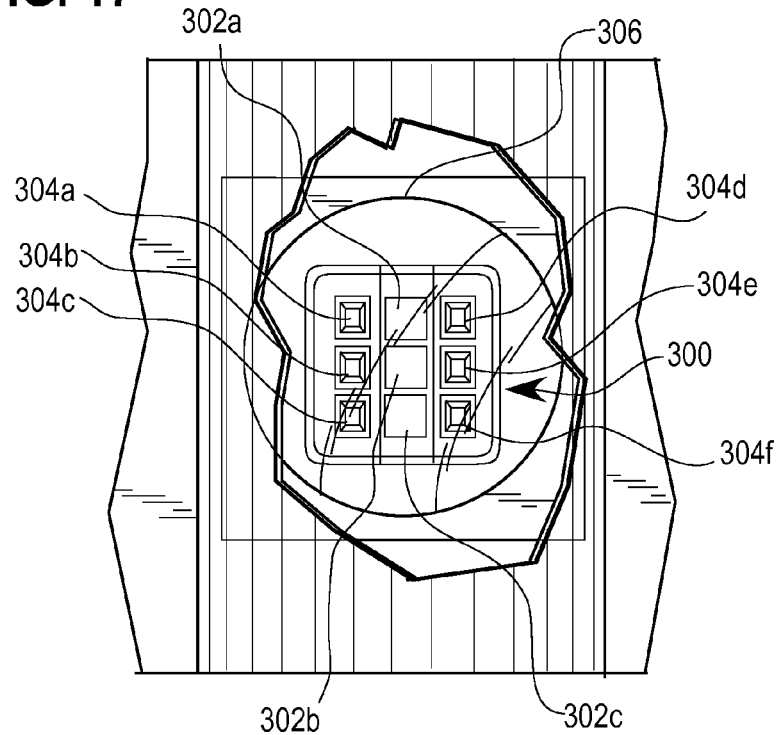
FIGS. 17-20 are elevational views of alternative embodiments of LED elements that may be used in the waveguides of FIGS. 11-16.
Figure 18:
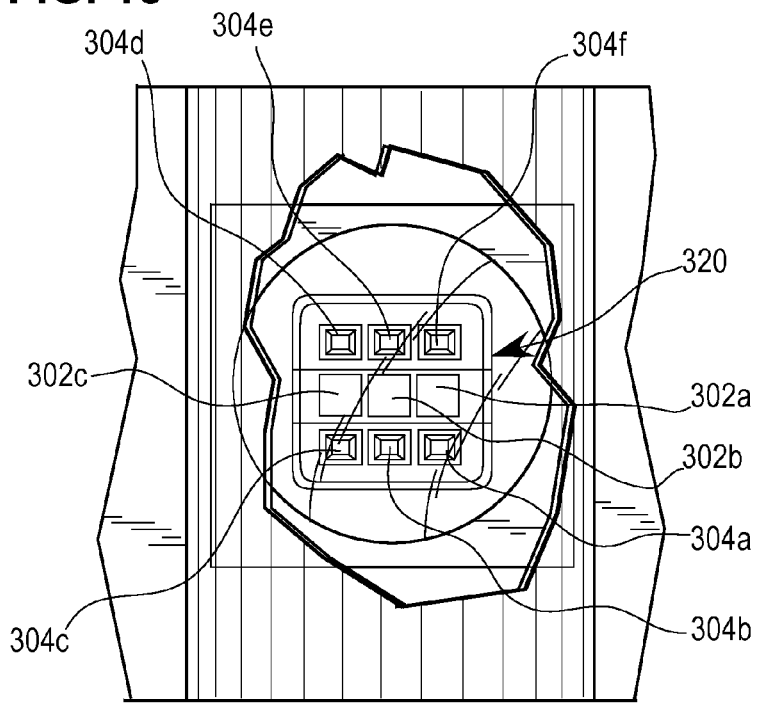
Figure 19:
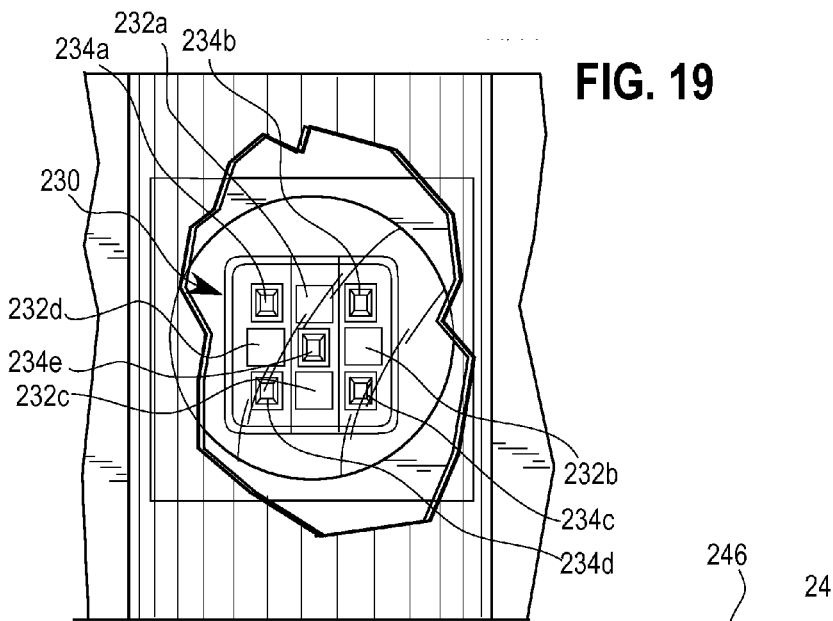
Figure 20:
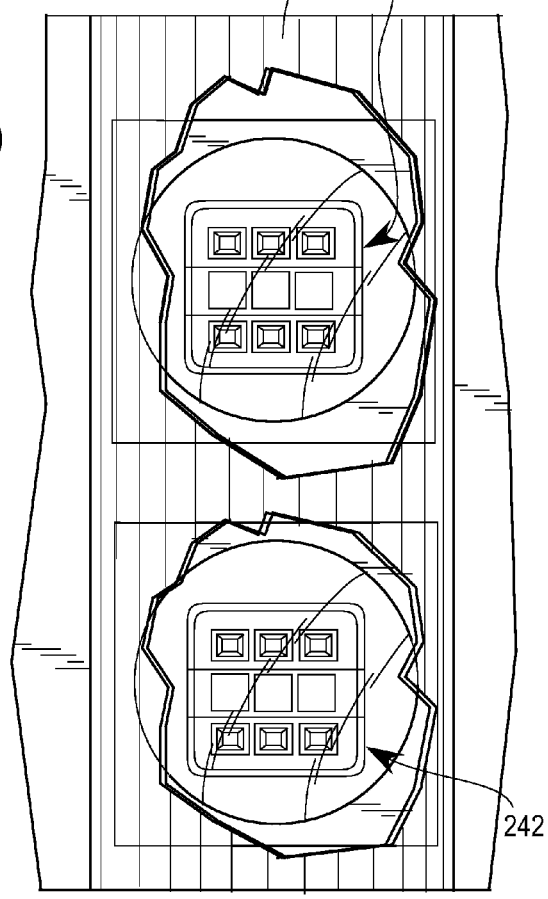

Further, the embodiments shown in FIGS. 11-16 include a light source comprising one or more LEDs disposed vertically such that light emitted from the LEDs is directed directly into the waveguide body sections. In the embodiments of FIGS. 11, 14, and 16, each LED element is disposed on an individual substrate spaced apart along the outer surface of the waveguide body sections. In contrast, each LED element of the embodiments of FIGS. 13 and 15 may be disposed on individual substrates or a common substrate carried by a centrally-disposed carrier 282, 294, respectively. Further, the embodiments of FIGS. 11, 13, and 16 include a single LED element disposed in each coupling cavity, whereas the embodiments of FIGS. 14 and 15 include a plurality of LED elements within each coupling cavity. Referring to FIG. 17, a multi-color LED element 300 includes one or more red LEDs 302a-302c surrounded by a plurality of blue-shifted yellow LEDs 304a-304f. A hemispherical dome lens 306 may be disposed over the LED element 300. The layout of the chips 302, 304 on the vertically disposed LED may be arranged and oriented as shown in FIGS. 17-20. For example, the embodiment shown in FIG. 18 includes an LED element 320 identical to the element 300 shown in FIG. 17, except that the element 320 is rotated 90 degrees (or any other angular extent) about an axis normal to the surface on which the LED component is disposed. Referring to FIG. 19, the LED element 230 includes four red LEDs 232a-232d and five blue-shifted yellow LEDs 234a-234e in a checkerboard pattern. Any LED chip arrangement and/or orientation as disclosed in U.S. patent application Ser. No. 14/101,147, filed Dec. 9, 2013, entitled "Luminaire Using Waveguide Bodies and Optical Elements" incorporated by reference herein and owned by the assignee of the present application, may be used in the devices disclosed herein. As shown in FIG. 20, where two LED elements 240, 242 are used, it may be desired to position the LEDs elements 240, 242 within the coupling cavity 246 along a common vertical axis or the LED elements may have different angular orientations, as desired. The orientation, arrangement, and position of the LEDs may be different or identical in each waveguide body section of a waveguide as desired.

Other embodiments of the disclosure including all of the possible different and various combinations of the individual features of each of the foregoing embodiments and examples are specifically included herein. Thus, for example, a waveguide body section may include extraction features of the same or a different shape, and the extraction features may be symmetric or asymmetric, the extraction features may have differing or the same geometry, spacing, size, etc. without departing from the scope of the invention.

INDUSTRIAL APPLICABILITY

As described above, directing light into a wide range of refraction angles enhances light mixing. A wide range of refracted light ray angles can be obtained by configuring the interface surfaces to include a wide range of angles relative to the incident light rays. Overall waveguide shapes and coupling feature and redirection feature shapes such as curved (including convex, concave, and combinations of convex and concave surfaces), planar, non-planar, tapered, segmented, continuous or discontinuous surfaces, regular or irregular shaped surfaces, symmetric or asymmetric shapes, etc. can be used, it being understood that, in general, light mixing (consistent with the necessary control over light extraction) can be further improved by providing an increased number of interface surfaces and/or more complex interface shapes in the light path.

When one uses a relatively small light source which emits into a broad (e.g., Lambertian) angular distribution (common for LED-based light sources), the conservation of etendue, as generally understood in the art, requires an optical system having a large emission area to achieve a narrow (collimated) angular light distribution. In the case of parabolic reflectors, a large optic is thus generally required to achieve high levels of collimation. In order to achieve a large emission area in a more compact design, the prior art has relied on the use of Fresnel lenses, which utilize refractive optical surfaces to direct and collimate the light. Fresnel lenses, however, are generally planar in nature, and are therefore not well suited to re-directing high-angle light emitted by the source, leading to a loss in optical efficiency. In contrast, in the present invention, light is coupled into the optic, where primarily TIR is used for re-direction and collimation. This coupling allows the full range of angular emission from the source, including high-angle light, to be re-directed and collimated, resulting in higher optical efficiency in a more compact form factor.

While specific coupling features and extraction feature parameters including shapes, sizes, locations, orientations relative to a light source, materials, etc. are disclosed as embodiments herein, the present invention is not limited to the disclosed embodiments, inasmuch as various combinations and all permutations of such parameters are also specifically contemplated herein. Any of the features such as various shaped coupling cavities, plug members, LED elements, masking element(s), redirection features, extraction features, etc. described and/or claimed in U.S. patent application Ser. No. 13/842,521, U.S. patent application Ser. No. 13/839,949, U.S. patent application Ser. No. 13/841,074, filed Mar. 15, 2013, entitled "Optical Waveguide Body" U.S. patent application Ser. No. 13/840,563, U.S. patent application Ser. No. 14/101,086, filed Dec. 9, 2013, entitled "Optical Waveguides and Luminaires Incorporating Same", U.S. patent application Ser. No. 14/101,132, filed Dec. 9, 2013, entitled "Waveguide Bodies Including Redirection Features and Methods of Producing Same," U.S. patent application Ser. No. 14/101,147, filed Dec. 9, 2013, entitled "Luminaire Using Waveguide Bodies and Optical Elements" U.S. patent application Ser. No. 14/101,129, filed Dec. 9, 2013, entitled "Simplified Low Profile Module with Light Guide for Pendant, Surface Mount, Wall Mount and Stand Alone Luminaires" and U.S. patent application Ser. No. 14/101,051, filed Dec. 9, 2013, entitled "Optical Waveguide and Lamp Including Same" incorporated by reference herein and owned by the assignee of the present application may be used in a luminaire, either alone or in combination with one or more additional elements, or in varying combination(s) to obtain light mixing and/or a desired light output distribution. Thus, for example, any of the waveguides or luminaires disclosed herein may include one or more coupling features, one or more light redirection features, one or more extraction features or optics, and/or particular waveguide or overall luminaire shapes and/or configurations as disclosed in such applications, as necessary or desirable. Other luminaire and waveguide form factors than those disclosed herein are also contemplated.

At least some of the luminaires disclosed herein are particularly adapted for use in installations, such as, replacement or retrofit lamps (e.g., LED PAR bulbs), outdoor products (e.g., streetlights, high-bay lights, canopy lights), and indoor products (e.g., downlights, troffers, a lay-in or drop-in application, a surface mount application onto a wall or ceiling, etc.) preferably requiring a total luminaire output of at least about 800 lumens or greater, and, more preferably, a total luminaire output of at least about 3000 lumens, and most preferably a total lumen output of about 10,000 lumens. Further, the luminaires disclosed herein preferably have a color temperature of between about 2500 degrees Kelvin and about 6200 degrees Kelvin, and more preferably between about 2500 degrees Kelvin and about 5000 degrees Kelvin, and most preferably about 2700 degrees Kelvin. Also, at least some of the luminaires disclosed herein preferably exhibit an efficacy of at least about 100 lumens per watt, and more preferably at least about 120 lumens per watt, and further exhibit a coupling efficiency of at least about 92 percent. Further, at least some of the luminaires disclosed herein preferably exhibit an overall efficiency (i.e., light extracted out of the waveguide divided by light injected into the waveguide) of at least about 85 percent. A color rendition index (CRI) of at least about 80 is preferably attained by at least some of the luminaires disclosed herein, with a CRI of at least about 88 being more preferable. A gamut area index (GAI) of at least about 65 is achievable as is a thermal loss of less than about 10%. Any desired form factor and particular output light distribution, such as a butterfly light distribution, could be achieved, including up and down light distributions or up only or down only distributions, etc.

Embodiments disclosed herein are capable of complying with improved operational standards as compared to the prior art as follows:

| | State of the art standards | Improved standards achievable by present embodiments |
|---|---|---|
| Input coupling efficiency (coupling + waveguide) | 90% | About 95% plus improvements through color mixing, source mixing, and control within the waveguide |
| Output efficiency (extraction) | 90% | About 95%: improved through extraction efficiency plus controlled distribution of light from the waveguide |
| Total system | ~80% | About 90%: great control, many choices of output distribution |

In at least some of the present embodiments the distribution and direction of light within the waveguide is better known, and hence, light is controlled and extracted in a more controlled fashion. In standard optical waveguides, light bounces back and forth through the waveguide. In the present embodiments, light is extracted as much as possible over one pass through the waveguide to minimize losses.

In some embodiments, one may wish to control the light rays such that at least some of the rays are collimated, but in the same or other embodiments, one may also wish to control other or all of the light rays to increase the angular dispersion thereof so that such light is not collimated. In some embodiments, one might wish to collimate to narrow ranges, while in other cases, one might wish to undertake the opposite.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

We claim:

1. An optical waveguide assembly, comprising:
   a plurality of separate body sections each comprising a coupling cavity for receiving an LED element and a light extraction feature spaced from the coupling cavity, wherein each body section comprises first and second curved walls disposed at an outer portion of the optical waveguide and that meet at an inflection portion spaced from another body section; and
   a mounting structure surrounding the plurality of separate body sections that maintains the plurality of separate body sections in assembled relationship.

2. The optical waveguide assembly of claim 1, further comprising an LED disposed in each coupling cavity.

3. The optical waveguide assembly of claim 1, further comprising a plurality of LEDs disposed in each coupling cavity.

4. The optical waveguide assembly of claim 1, wherein all of the body sections are shaped substantially identical to one another and each of the body sections is wedge-shaped.

5. The optical waveguide assembly of claim 4, wherein each of the first and second curved walls comprises a continuously curved surface.

6. The optical waveguide assembly of claim 1, wherein each body section comprises a plurality of light extraction features surrounding the coupling cavity.

7. The optical waveguide assembly of claim 6, wherein the light extraction features of each body section are substantially identical to the plurality of light extraction features of other body sections.

8. The optical waveguide assembly of claim 7, wherein the light extraction features of each body section are annular in shape.

9. The optical waveguide assembly of claim 8, wherein the light extraction features of each body section are concentric with the coupling cavity of the body section.

10. The optical waveguide assembly of claim 1, wherein the coupling cavity is defined by a plurality of side walls and a base wall.

11. The optical waveguide assembly of claim 10, wherein the side walls are tapered and planar.

12. The optical waveguide assembly of claim 1, wherein the mounting structure comprises a mounting ring secured to a base mounting surface.

13. The optical waveguide assembly of claim 12, wherein the mounting structure comprises one of a specular reflective inner surface and a reflective white inner surface.

14. The optical waveguide assembly of claim 12, wherein the base mounting surface is disposed in thermal communication with a heat exchanger.

15. The optical waveguide assembly of claim 14, wherein LEDs are disposed on a circuit board disposed on the base mounting surface and extend into the coupling cavities.

16. The optical waveguide assembly of claim 1, wherein each coupling cavity comprises at least one light coupling feature that extends into the respective body section.

17. The optical waveguide assembly of claim 1, wherein each coupling cavity is disposed on one of an inner portion and an outer surface of the waveguide body section.

18. The optical waveguide assembly of claim 1, wherein at least one waveguide body section comprises a plurality of coupling cavities.

19. The optical waveguide assembly of claim 1, wherein each waveguide body section has a width substantially greater than an overall thickness thereof, and wherein the LED element extends into the coupling cavity transverse to the width of the waveguide body section.

20. The optical waveguide assembly of claim 19, wherein the LED element extends into the waveguide coupling cavity at a non-zero angle relative to a central axis of the coupling cavity.

21. The optical waveguide assembly of claim 1, wherein each waveguide body section has a width substantially greater than an overall thickness thereof and an edge surface and wherein the LED element extends into the waveguide body section from the edge surface.

22. The optical waveguide assembly of claim 21, wherein the LED element has a central axis disposed at a non-zero angle relative to a lateral extent of the waveguide body section.

23. The optical waveguide assembly of claim 21, wherein the LED element comprises first and second sets of LEDs wherein each LED of the first set comprises at least one LED of a first spectral emission characteristic and at least one LED of a second different spectral emission characteristic.

24. The optical waveguide assembly of claim 23, wherein each LED of the first set comprises a blue-shifted yellow LED and each LED of the second set comprises a red LED, wherein the red LEDs are disposed between the blue-shifted yellow LEDs and wherein the blue-shifted yellow LEDs have a first height and the red LEDs have a second height different from than the first height, the LED element further comprising a lens disposed over the first and second sets of LEDs.

25. The optical waveguide assembly of claim 24, wherein each LED is oriented such that the second set of LEDs is aligned approximately parallel to a central axis of the coupling cavity.

26. The optical waveguide assembly of claim 24, wherein each LED is oriented such that the second set of LEDs is aligned approximately perpendicular to the central axis of the coupling cavity.

27. The optical waveguide assembly of claim 23, wherein each LED of the first set comprises a blue-shifted yellow LED and each LED of the second set comprises a red LED, wherein the red LEDs and the blue-shifted yellow LEDs are disposed in a checkerboard pattern, the LED element further comprising a lens disposed over the first and second sets of LEDs.

28. A light engine, comprising:
   an optical waveguide comprising
      a plurality of body sections each of a wedge-shape and comprising a recess for receiving at least one LED and a plurality of curved light extraction features surrounding the recess, wherein each body section comprises first and second curved walls disposed at an outer portion of the optical waveguide and that meet at an inflection portion spaced from another body section;
   a mounting structure surrounding the plurality of body sections that maintains the plurality of body sections in assembled relationship;
   a base mounting surface; and
   a plurality of LEDs disposed on a circuit board wherein the circuit board, the mounting structure, and assembled body sections are secured relative to the base mounting surface.

29. The light engine of claim 28, further comprising a heat exchanger in thermal communication with the plurality of LEDs.

30. The light engine of claim 29, wherein the base mounting surface is secured to the heat exchanger.

31. The light engine of claim 28, wherein the mounting structure comprises specular reflective inner surfaces adjacent and at least substantially conforming to outer surfaces of the plurality of body sections.

32. The light engine of claim 31, wherein each of the first and second curved walls comprises a continuously curved surface.

33. The light engine of claim 32, wherein the recess of each body section is radially aligned with and proximate the inflection portion of the body section.

34. The light engine of claim 33, wherein the extraction features of each body section are concentric with respect to the recess of such body section.

35. The light engine of claim 28, wherein the recess is defined by a plurality of sidewalls and a base wall.

36. The light engine of claim 35, wherein the sidewalls are tapered and planar.

37. The light engine of claim 28, further comprising a carrier that is disposed against an inner portion of each wedge-shaped body section, wherein the plurality of LEDs is disposed on a circuit board, and the circuit board is secured to the carrier.

38. The light engine of claim 28, wherein each recess is disposed on an outer surface of each body section.

39. An optical waveguide assembly, comprising:
a plurality of separate body sections each comprising a coupling cavity for receiving an LED element and a light extraction feature having an aspect ratio spaced from the coupling cavity; and
a mounting structure surrounding the plurality of separate body sections that maintains the plurality of body sections in assembled relationship, wherein the aspect ratio is greater than 0.1.

40. A light engine, comprising:
an optical waveguide comprising
a plurality of body sections each of a wedge-shape and comprising a recess for receiving at least one LED and a plurality of curved light extraction features surrounding the recess, wherein each of the curved light extraction features has an aspect ratio;
a mounting structure surrounding the plurality of body sections that maintains the plurality of body sections in assembled relationship;
a base mounting surface; and
a plurality of LEDs disposed on a circuit board wherein the circuit board, the mounting structure, and assembled body sections are secured relative to the base mounting surface, wherein the aspect ratios of the curved light extraction features increase with distance from the recess.

41. The light engine of claim 40, wherein the aspect ratios of the plurality of curved light extraction features vary between about 0.1 to about 25.

42. The light engine of claim 40, wherein the aspect ratios of the plurality of curved light extraction features vary between about 0.2 to about 8.

* * * * *